US006469715B1

(12) United States Patent
Carter et al.

(10) Patent No.: US 6,469,715 B1
(45) Date of Patent: *Oct. 22, 2002

(54) SYSTEM AND METHOD FOR CONTROLLING THE OPERATION OF A GRAPHICAL OBJECT USING A PROJECT

(75) Inventors: Eric H. Carter, Beaverton; Scott J. Schanel; Kenneth R. Ostrin, both of Portland, all of OR (US)

(73) Assignee: Corel Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/273,170

(22) Filed: Mar. 19, 1999

(51) Int. Cl.[7] .................................................. G06F 3/14
(52) U.S. Cl. ........................ 345/763; 345/764; 345/762; 345/810; 707/515; 707/516
(58) Field of Search .......................... 707/516, 515; 345/763, 967, 762, 764, 810; 709/769, 315, 318

(56) References Cited

U.S. PATENT DOCUMENTS

| 5,280,610 A | 1/1994 | Travis, Jr. et al. ........... 395/600 |
| 5,325,479 A | 6/1994 | Kaasila ........................ 395/151 |
| 5,345,543 A | 9/1994 | Capps et al. ................. 395/137 |
| 5,481,740 A | 1/1996 | Kodosky ...................... 395/800 |
| 5,481,741 A | 1/1996 | McKaskle et al. ........... 395/800 |
| 5,499,365 A | 3/1996 | Anderson et al. ............ 395/600 |
| 5,517,663 A | 5/1996 | Kahn ........................... 395/800 |
| 5,522,024 A | 5/1996 | Hiraga et al. ................. 395/155 |
| 5,524,193 A | 6/1996 | Covington et al. .......... 395/154 |
| 5,526,478 A | 6/1996 | Russell, Jr. et al. .......... 395/154 |
| 5,551,030 A | 8/1996 | Linden et al. ................ 395/600 |
| 5,559,943 A | 9/1996 | Cyr et al. ..................... 395/155 |
| 5,560,012 A | 9/1996 | Ryu et al. ..................... 395/700 |
| 5,566,295 A | 10/1996 | Cypher et al. ............... 395/161 |
| 5,570,462 A | 10/1996 | McFarland ................... 395/136 |
| 5,574,918 A | 11/1996 | Hurley et al. ................ 395/561 |
| 5,577,189 A | 11/1996 | Gay et al. .................... 395/326 |
| 5,583,983 A | 12/1996 | Schmitter .................... 395/705 |
| 5,586,326 A | 12/1996 | Ryu et al. .................... 395/701 |
| 5,592,600 A | 1/1997 | De Pauw et al. ............ 395/140 |
| 5,600,765 A | 2/1997 | Ando et al. .................. 395/133 |
| 5,600,780 A | 2/1997 | Hiraga et al. ................ 395/334 |
| 5,603,034 A | 2/1997 | Swanson ...................... 395/701 |
| 5,611,031 A | 3/1997 | Hertzfeld et al. ........... 395/133 |
| 5,617,114 A | * 4/1997 | Bier et al. .................... 345/113 |
| 5,627,959 A | 5/1997 | Brown et al. ................ 395/356 |
| 5,634,095 A | 5/1997 | Wang et al. .................. 395/326 |
| 5,644,770 A | 7/1997 | Burke et al. ................. 395/710 |
| 5,652,909 A | 7/1997 | Kodosky ...................... 395/800 |
| 5,671,380 A | 9/1997 | Hidaka ......................... 395/348 |
| 5,680,617 A | * 10/1997 | Gough et al. ................ 707/104 |
| 5,689,286 A | 11/1997 | Wugofski ..................... 345/348 |
| 5,704,028 A | 12/1997 | Schanel et al. .............. 395/140 |
| 5,710,926 A | 1/1998 | Maurer ......................... 395/701 |
| 5,715,473 A | 2/1998 | Reed ............................ 395/805 |
| 5,737,507 A | * 4/1998 | Smith ........................... 345/433 |
| 5,760,788 A | 6/1998 | Chainini et al. ............. 345/474 |
| 5,767,852 A | 6/1998 | Keller et al. ................. 345/348 |
| 5,799,157 A | 8/1998 | Escallon ....................... 395/227 |
| 5,799,193 A | 8/1998 | Sherman et al. ............. 395/703 |
| 5,799,306 A | 8/1998 | Sun et al. ..................... 707/10 |
| 5,815,153 A | 9/1998 | Isensee et al. ............... 345/354 |
| 5,832,481 A | 11/1998 | Sheffield ........................ 707/4 |
| 6,157,935 A | * 12/2000 | Tran et al. ................... 707/503 |

* cited by examiner

*Primary Examiner*—Kristine Kincaid
*Assistant Examiner*—Thomas T. Nguyen
(74) *Attorney, Agent, or Firm*—Baker Botts L.L.P.

(57) ABSTRACT

A system for controlling the operation of a graphical object includes a processor coupled to an input device, an output device, a memory, and a data retrieval device. The processor executes an application that supports an event manager which detects the initiation of an event upon a graphical object. The application further supports a project that dynamically associates with and dissociates from the graphical object to execute instructions associated with the event.

12 Claims, 10 Drawing Sheets

|   | APPLICATION | DOCUMENT | DIAGRAM |
|---|---|---|---|
| GRAPHICAL SHAPES | 160 | 162 | 164 |
| GRAPHICAL CONNECTORS | 166 | 168 | 170 |
| GRAPHICAL DIAGRAMS | 172 | 174 | – |
| DOCUMENTS | 176 | – | – |

*FIG. 4A*

DOCUMENT NUMBER

| | 1 | 2 | ... | n | ... | N |
|---|---|---|---|---|---|---|
| INTERFACE MODULE IDENTIFIER | 180 | 182 | ... | 184 | ... | 186 |

*FIG. 4B*

GRAPHICAL DIAGRAM NUMBER

| | 1 | 2 | ... | n | ... | N |
|---|---|---|---|---|---|---|
| INTERFACE MODULE IDENTIFIER | 190 | 192 | ... | 194 | ... | 196 |

*FIG. 4C*

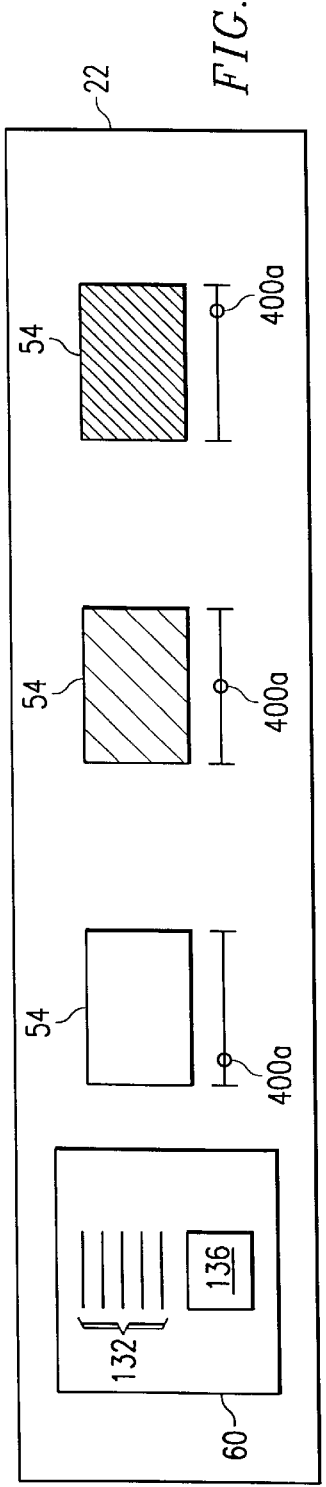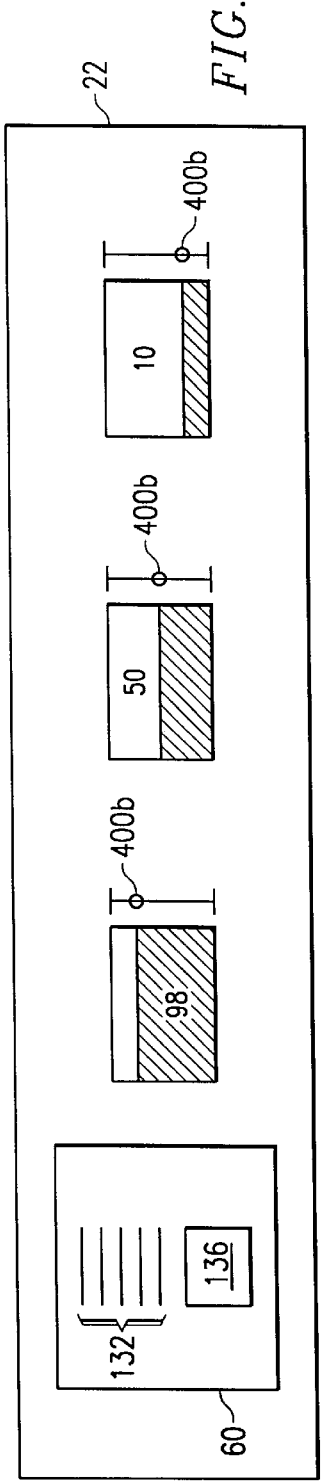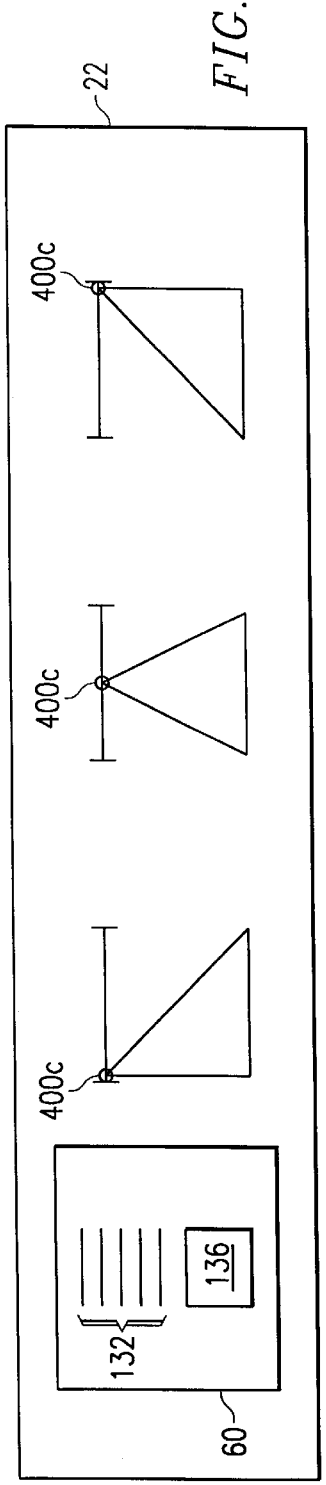

SYSTEM AND METHOD FOR CONTROLLING THE OPERATION OF A GRAPHICAL OBJECT USING A PROJECT

CROSS-REFERENCE TO RELATED APPLICATIONS

This application is related to and filed concurrently with pending U.S. patent application Ser. No. 09/272,928, entitled System and Method for Processing an Event of a Graphical Object; pending U.S. patent application Ser. No. 09/273,427, entitled System and Method for Processing Data for a Graphical Object; and pending U.S. patent application Ser. No. 09/272,756, entitled System and Method for Adjusting a Graphical Object.

TECHNICAL FIELD OF THE INVENTION

This invention relates in general to computer graphics systems, and more particularly to a system and method for controlling the operation of a graphical object using a project.

BACKGROUND OF THE INVENTION

Computer graphics applications include different types of graphical objects, such as documents, graphical diagrams, graphical shapes, and graphical connectors. The graphical objects of an application may be arranged in a number of hierarchical levels according to the types of the graphical objects. For example, a document of the application may include one or more graphical diagrams. A graphical diagram of a document may include one or more graphical shapes or graphical connectors.

A user of the graphics application or the computer upon which the application operates may initiate events upon a graphical object to perform associated functions. Prior attempts to process events for a graphical object require needlessly complex, duplicative, and unmanageable software and/or hardware. As a result, opportunities to define the functions executed in response to the events are limited.

SUMMARY OF THE INVENTION

In accordance with the present invention a system for controlling the operation of a graphical object using a project is provided which substantially eliminates or reduces disadvantages and problems associated with previous computer graphics systems.

In accordance with one embodiment of the present invention, a system for controlling the operation of a graphical object includes a memory that stores a number of graphical objects, an event manager coupled to the memory, and a project coupled to the event manager. The event manager detects the initiation of an event upon one of a number of graphical objects and further detects the termination of the event. The project associates with the particular graphical object in response to the detected event initiation and executes instructions associated with the event. The project dissociates from the graphical object in response to the detected event termination.

Another embodiment of the present invention is a method for controlling the operation of a graphical object. The method includes presenting a number of options to be selected by a user to define a class of graphical objects and presenting an event menu operated by the user to select an event associated with the class of graphical objects. The method continues by presenting an editor operated by the user to write instructions. The method further includes detecting the initiation of the selected event upon a particular one of the class of graphical objects. The method concludes by executing a portion of the instructions in response to the selected event initiation.

Yet another embodiment of the present invention is a project for controlling the operation of a graphical object that includes an interface module and a plurality of instructions. The interface module associates with a particular one of a number of graphical objects in response to the initiation of an event upon the graphical object and dissociates from the particular graphical object in response to the termination of the event. The instructions execute in response to the event.

Technical advantages of the present invention include a system for processing an event of a graphical object. The system includes an event manager and an interface module. The event manager detects the initiation of an event upon a graphical object. The interface module associates with the graphical object in response to the detected event initiation and communicates event information defining the event to a client. The interface module further dissociates from the graphical object in response to the termination of the event so that the interface module is free to communicate event information for another event initiated upon the same or different graphical object. In this respect, the system of the present invention supports dynamically associating and dissociating an interface module with the same or different graphical objects to communicate event information to a client.

A graphical object upon which an event may be initiated may comprise one of many different types of graphical objects, including documents, graphical diagrams, graphical shapes, or graphical connectors of a computer graphics application. Interface modules may be characterized by a particular type to process events for graphical objects of a corresponding type. Therefore, an interface module may process document events, graphical diagram events, graphical shape events, or graphical connector events.

Graphical objects of a particular type may be organized in a number of classes to define varying scopes of the graphical objects. For example, a first class of graphical shapes may include all of the graphical shapes of a computer graphics application. A second class of graphical shapes may include all of the graphical shapes of a particular document of the computer graphics application. A third class of graphical shapes may include all of the graphical shapes of a particular graphical diagram of the computer graphics application. An interface module of a particular type may dynamically associate with or dissociate from any of the graphical objects of a class of a corresponding type, and process events for those graphical objects. Therefore, a particular interface module that processes graphical shape events may associate with or dissociate from any of the graphical shapes of a particular class, and process the events initiated upon those graphical shapes. In this respect, the system of the present invention generates a number of different types of interface modules to process events for any scope of graphical objects of a corresponding type.

Further advantages of the present invention include an interface module that may process nested events initiated upon graphical objects of a particular class during the execution of a primary event upon another graphical object of the class. In particular, an interface module may associate with a first graphical object within a class in response to a primary event initiated upon that object. In response to a nested event initiated upon another graphical object of the same class prior to the termination of the primary event, the interface module may dynamically dissociate from the first graphical object, associate with the second graphical object to communicate event information defining the nested event, and reassociate with the first graphical object to continue communicating event information defining the primary event.

In this respect, an interface module may process any number and combination of nested events initiated during the execution of a primary event. A particular advantage provided by this aspect of the present invention is that by processing nested events, an interface module of the present invention facilitates the execution of enhanced instructions, processes, or functions by the clients of the interface module. In one embodiment, a set of instructions that executes in response to a primary event may itself initiate one or more nested events during the course of execution in order to perform complex tasks. For example, a client of an interface module may execute a set of instructions that initiate one or more nested events to identify a database, to retrieve data from the database, and to insert the data in a file. The accurate and complete performance of these tasks may depend upon the processing of the nested events prior to the completion of the primary event. Therefore, by processing nested events, the interface modules of the present invention facilitate the execution of complex tasks.

A particular advantage provided by the dynamic association and dissociation of interface modules with graphical objects is the ability of a user of the system to customize the behavior of entire classes of graphical objects. For example, a user may generate projects which comprise an interface module and a set of instructions, forms, and modules designed to customize the behavior of a class of graphical objects. The system provides a graphical user interface (GUI) operated by the user to define the type and scope of graphical objects to be controlled by a project. The system further provides a GUI operated by the user to create, delete, or modify the collection of instructions, forms, and modules that execute in response to the initiation of selected events upon any of the defined class of graphical objects. In this respect, a user of the system may create projects to customize the behavior of a particular type and scope of graphical objects.

Further advantages provided by system 10 include projects that perform data processing functions for a defined class of graphical objects. In particular, a project may present a form operated by a user to generate a data request that defines the data processing functions to be performed by the project. In one embodiment, a user may generate a data request to retrieve, store, or update data items of a data client identified by the user. The project performs the defined data processing functions in response to the initiation of one or more selected events upon any of a class of graphical objects defined for the project.

The project may further include instructions that perform enhanced functions in response to the execution of the data processing functions. For example, the instructions may execute to customize the characteristics or properties of the class of graphical objects in response to data items retrieved from a data client. In another example, the instructions may execute to graphically represent to a user the contents of a data client. In this respect, a user of system 10 may interactively define data processing functions to be performed by a project for a class of graphical objects 30. The user may further define enhanced functions that execute in response to the execution of the data processing functions.

Another advantage provided by system 10 is a project that presents adjustment controls that adjust any graphical characteristic of a graphical object in any manner defined by a user. The graphical characteristics of a graphical object that may be adjusted by a user of the present invention includes graphical characteristics beyond those that may be adjusted using standard control points.

Other technical advantages are readily apparent to one of skill in the art from the attached figures, description, and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein:

FIGS. 4A–4C illustrate an arrangement of interface modules and/or projects to be used in the present invention;

FIGS. 10A–10C illustrate an application of a project to present adjustment controls operated by a user to adjust a graphical object;

DETAILED DESCRIPTION OF THE INVENTION

Figure 1:
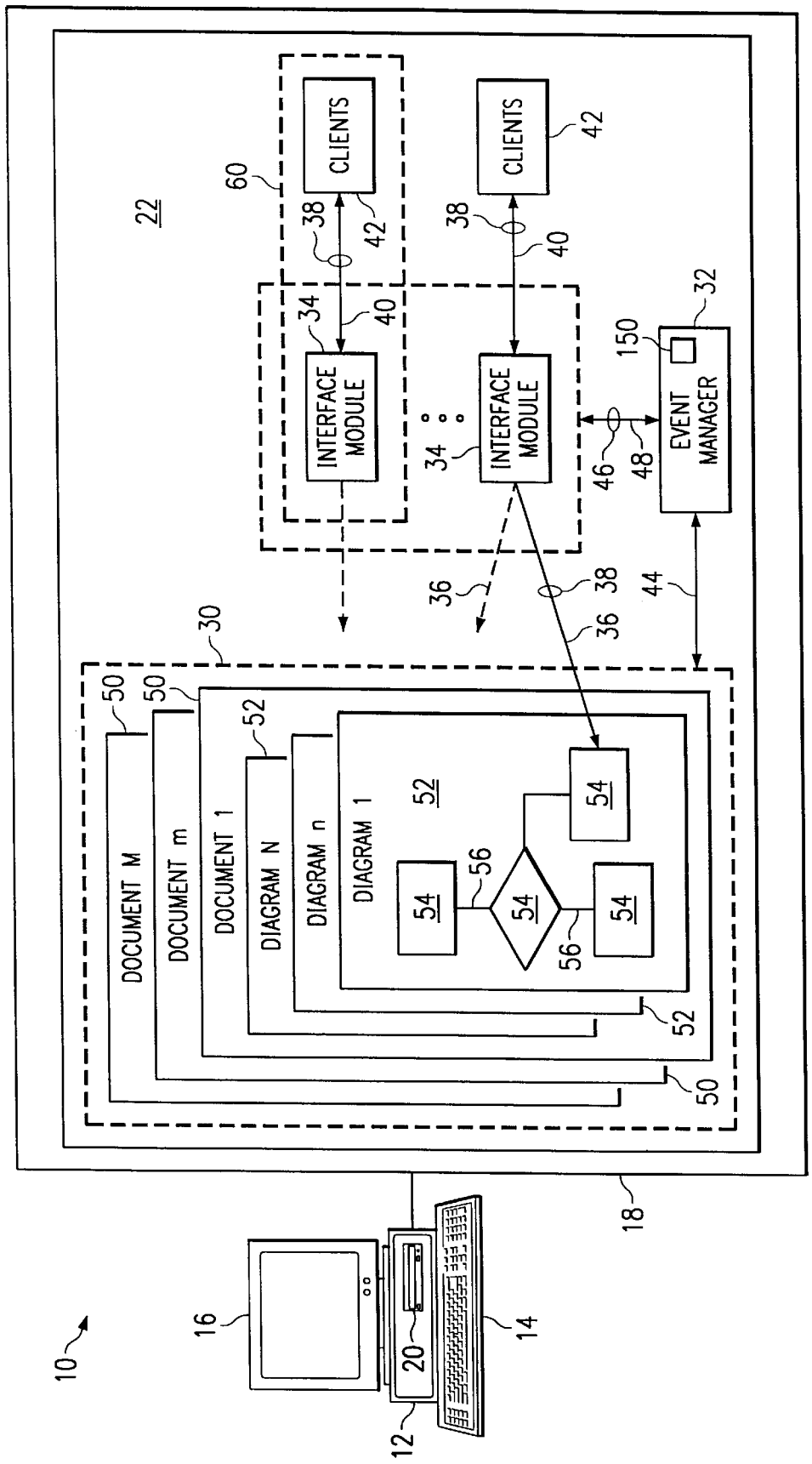
FIG. 1 illustrates a block diagram of a system for processing an event of a graphical object in accordance with the present invention.

FIG. 1 illustrates a block diagram of a system 10 for processing an event of a graphical object 30. System 10 includes a processor 12 coupled to an input device 14, an output device 16, a memory 18, and a data retrieval device 20. In general, system 10 supports dynamically associating and dissociating an interface module 34 with the same or different graphical objects 30 to communicate event information 38 to clients 42. In one embodiment, an interface module 34 and a client 42 may be arranged in a project 60 generated by a user of system 10 to customize the behavior of a particular type and scope of graphical objects 30.

Processor 12 comprises a central processing unit associated with a computer system, such as a mainframe, workstation, a laptop computer, a personal digital assistant, or any other suitable general purpose data processing facility. In general, processor 12 executes application 22 with any suitable operating system environment, such as, for example, MS-DOS, PC-DOS, OS2, MAC-OS™, UNIX™, or WINDOWS™.

Input device 14 comprises a keyboard, mouse, graphics tablet, touch screen, pressure sensitive pad, joy stick, trackball, light pen, microphone, or any other suitable input device. Input device 14 may be used to execute an event upon a graphical object 30 of application 22. Output device 16 comprises a cathode ray tube display, a liquid crystal display, a flat panel display, a printer, a plotter, or any other suitable output device.

Memory 18 comprises a file, a stack, or any other suitable organization of volatile or non-volatile memory that stores application 22, graphical objects 30, and any associated files, tables, or buffers, in RAM, ROM, CD-ROM, or any other form of magnetic or optical storage. Data retrieval device 20 may comprise a disk drive, a CD-ROM drive, a hard drive, or any other suitable magnetic or optical data retrieval device.

Application 22 comprises a set or collection of instructions, procedures, and/or related data adapted for implementation in a suitable computer language such as, for example, Visual Basic, JAVA, C++, or any other appropriate development language. Application 22 may be a stand-alone application or delivered integral to or with other computer graphics applications.

A graphical object 30 of application 22 may comprise one of many different types of graphical objects, including a document 50, a graphical diagram 52, a graphical shape 54, a graphical connector 56, or any other suitable graphical object of application 22 upon which an event may be executed. In general, a graphical object 30 exhibits particular behavior in response to the event initiated upon it. Different types of graphical objects 30 may exhibit behavior different from other types of graphical objects 30 in response to the same type of event. A user of system may customize the behavior of one or more graphical objects 30 using a project 60, as described in more detail hereinafter. In one embodiment, graphical objects 30 may be stored in one or more files, charts, tables, or any other suitable organization of memory 18 that may be accessed by processor 12 to execute application 22.

Graphical objects 30 may be arranged in a number of hierarchical levels in application 22 according to documents 50, graphical diagrams 52, graphical shapes 54, and graphical connectors 56. For example, an application 22 may include one or more documents 50. Each document 50 comprises a graphical object 30 upon which an event may be executed, and may further include one or more graphical diagrams 52. Each graphical diagram 52 comprises a graphical object 30 upon which an event may be executed, and may further include graphical shapes 54 and graphical connectors 56. Graphical shapes 54 and graphical connectors 56 also comprise graphical objects 30 upon which an event may be executed.

Each graphical object 30 may be arranged in one or more classes generated by application 22, a user of system 10, or both. Each class defines a scope of graphical objects 30 of a particular type. For example, a first class of graphical shapes 54 may include all of the graphical shapes 54 of a first graphical diagram 52 of application 22. A second class of graphical shapes 54 may include all of the graphical shapes 54 of a first document 50 of application 22. A third class of graphical shapes 54 may include all of a subset of graphical shapes 54 in application 22, such as all of the "process" shapes 54 of application 22. A particular graphical shape 54 that is a "process" shape and belongs to both the first graphical diagram 52 of application 22 and the first document 50 of application 22 is a member of each of the first, second, and third classes of graphical shapes 54, as described above. Similarly, other classes may define varying scopes of documents 50, graphical diagrams 52, graphical connectors 56, or any other type of graphical objects 30 of application 22.

An event comprises activity executed by processor 12, input device 14, or any other suitable component of system 10 upon a graphical object 30 of application 22. Events may be characterized according to particular "mouse" activities such as "BeforeDoubleClick," "UponDoubleClick," "UponMove" or any other events executed by a mouse. System 10 further supports particular events for particular types of graphical objects 30. For example, system 10 supports events that open, close, save, print, or execute any other suitable function upon documents 50 and graphical diagrams 52. System 10 further supports events that activate, move, resize, create, delete, or execute any other suitable function upon graphical shapes 54 and graphical connectors 56. One of skill in the art can appreciate, however, that the particular events listed for the particular types of graphical objects 30 is not an exhaustive list of events supported by system 10.

Event manager 32 comprises any suitable combination of hardware and/or software components to support dynamically associating and dissociating one or more selected interface modules 34 with a graphical object 30 upon which an event is initiated. In particular, event manager 32 includes processing components, program instructions, memory, and related data to detect the initiation of an event upon a graphical object 30 of application 22, to initiate the association of one or more interface modules 34 with the graphical object 30, and then to initiate the dissociation of the interface modules 34 and the graphical object 30 so that the interface modules 34 are free to process further events for the same or different graphical objects 30. In one embodiment, event manager 32 stores an arrangement 150 of interface modules 34, as described in greater detail with reference to FIGS. 4A–4C. Event manager 32 may reference arrangement 150 to determine the interface modules 34 which may associate with a particular class of graphical objects 30.

Event manager 32 detects the initiation or termination of an event upon a graphical object 30 of application 22 using link 44 and communicates commands 46 to selected interface modules 34 using a link 48. Commands 46 include addressing information for the graphical object 30 upon which the event is initiated, instructions to associate with the graphical object 30, instructions to dissociate from the graphical object 30, and/or any other suitable information and data used by the selected interface modules 34 to associate with and/or dissociate from graphical object 30. Link 44 comprises any suitable data path that supports detecting the initiation or termination of events upon graphical objects 30. Link 48 comprises any suitable data path that supports communicating commands 46 from event manager 32 to selected interface modules 34 and, in one embodiment, acknowledgments from modules 34 to event manager 32.

Although event manager 32 is illustrated in FIG. 1 separate from interface modules 34, in one embodiment of system 10, event manager 32 may be integral to interface modules 34 so that each module 34 may perform some or all of the features and functions of event manager 32. In this embodiment, for example, each interface module 34 may autonomously determine whether to associate with or dissociate from a particular graphical object 30 upon which an event is initiated.

An interface module 34 includes any suitable combination of program instructions, interfaces, memory, and related data to associate with a graphical object 30 in response to commands 44, to communicate event information 38 defining the event from graphical object 30 to clients 42, and to dissociate from the graphical object 30 in response to commands 46. In one embodiment, interface module 34 performs these functions on behalf of a project 60. Event information 38 includes any number and combination of codes, references, classifications, or any other suitable information defining the event executed upon graphical object 30. Event information 38 may be formatted according to any suitable communication protocol employed by processor 12 to execute application 22.

Pointer 36 of interface module 34 comprises any suitable referencing, linking, or addressing information used to associate interface module 34 to an address, location, or some other identifier of a graphical object 30 during the execution of an event upon that object 30. An important advantage of pointer 36 is that when an event is finished or when no events are executing in application 22, pointer 36 (as illustrated using dashed lines) does not associate the interface module 34 with any graphical objects 30. Therefore, an interface module 34 may use pointer 36 to associate with a first graphical object 30 upon which a first event is initiated, to dissociate from the first graphical object 30 when the first event is finished, and to associate with a second graphical object 30 upon which a second event is initiated. In this respect, interface modules 34 support processing events executed upon the same or different graphical objects 30 of application 22.

A link 40 comprises any suitable association or data path that supports communicating event information 38 from an interface module 34 to a client 42. Although FIG. 1 generally illustrates one link 40 from an interface module 34 to clients 42, system 10 supports any number and combination of links 40 to support any suitable mapping from an interface module 34 to one or more clients 42. A client 42 comprises a collection of instructions, processes, or functions that execute in response to event information 38 communicated by an interface module 34. For example, a client 42 may comprise a set of instructions that executes in response to event information 38 defining an activation event executed upon a particular graphical object 30 of application 22.

Although clients 42 are illustrated in FIG. 1 as a part of application 22, clients 42 may be arranged separate from or integral to application 22. For example, a client 42 may comprise instructions associated with another application, such as another computer graphics application of system 10. In another example, client 42 may comprise instructions associated with the operating system of processor 12. A particular advantage provided by this aspect of system 10 is that interface module 34 may communicate event information 38 associated with a particular graphical object 30 to clients 42 of the same or different application to support the execution of functions across applications of system 10.

As described in more detail with reference to FIG. 3, application 22 generates a number of different types of interface modules 34 to process events for varying scopes of graphical objects 30 of a corresponding type. In particular, interface modules 34 may be characterized by a particular type to process events for graphical objects 30 of a corresponding type. For example, application 22 includes one or more interface modules 34 of a first type to process events for documents 50 of application 22, (e.g., "document event interface module"). Similarly, application 22 includes one or more interface modules 34 of a second, third, and fourth type to process events for graphical diagrams 52, (e.g., "diagram event interface module"); graphical shapes 54, (e.g., "shape event interface module"); and graphical connectors 56, (e.g., "connector event interface module") of application 22, respectively.

An interface module 34 of a particular type may process events for any of a corresponding type of graphical objects 30 of a particular class. For example, a shape event interface module 34 may process events for all graphical shapes 54 of application 22, events for all graphical shapes 54 of a particular document 50 of application 22, events for all graphical shapes 54 of a particular graphical diagram 52 of application 22, or events for any other scope of graphical shapes 54 arranged in a class. A diagram event interface module 34 may process events for all graphical diagrams 52 of application 22, events for all graphical diagrams 52 of a particular document 50 of application 22, or events for any other scope of graphical diagrams 52 arranged in a class. Application 22 may similarly associate a connector event interface module 34 and a document event interface module 34 with a particular scope of graphical objects 30 of a corresponding type arranged in a class.

In one embodiment of system 10, an interface module 34 and a client 42 may be arranged together in a project 60 to process events for and customize the behavior of a particular type and scope of graphical objects 30. In particular, a project 60 may be characterized by a particular type and comprise an interface module 34 of the corresponding type. For example, system 10 supports a document project 60 that includes a document event interface module 34 to process events for documents 50, a diagram project 60 that includes a diagram event interface module 34 to process events for graphical diagrams 52, a shape project 60 that includes a shape event interface module 34 to process events for graphical shapes 54, and a connector project 60 that includes a connector event interface module 34 to process events for graphical connectors 56. The interface module 34 of a particular type of project 60 may process events for a particular scope of graphical objects 30 of a corresponding type. For example, a shape event interface module 34 of a shape project 60 may process events for any scope of graphical shapes 54 arranged in a particular class.

A project 60 further comprises a client 42 that includes a collection of instructions, forms, or modules that execute to control the operation of the particular type and scope of graphical objects 30 in response to the events that are processed by the associated interface module 34. By creating and/or modifying the instructions, forms, and modules of a project 60, and associating the execution of these components with selected events, a user of system 10 may customize the behavior of a class of graphical objects 30.

A user of system 10 may create projects 60 using a graphical user interface (GUI) presented by application 22. In particular, a user may determine the type and scope of graphical objects 30 to be controlled by a project 60 using the GUI described in more detail with reference to FIG. 5. Furthermore, the user may create, delete, and/or modify the collection of instructions, forms, and modules that execute in response to particular events initiated upon the graphical objects 30, using the GUI described in more detail with reference to FIG. 6. In this respect, a user of system 10 may create projects 60 to customize the behavior of a particular type and scope of graphical objects 30 in response to the particular events initiated upon the objects.

In operation, event manager 32 and interface modules 34 enable a variety of features and functions to process events initiated upon graphical objects 30 of application 22. In general, event manager 32 detects the initiation of an event and identifies the graphical object 30 upon which the event is initiated, using link 44. Event manager 32 also determines to which classes the graphical object 30 belongs. Based upon the type of graphical object 30 (e.g., document 50, graphical diagram 52, graphical shape 54, or graphical connector 56) and the classes to which the graphical object 30 belongs, event manager 32 initiates the association of one or more selected interface modules 34 with the graphical object 30. In a particular embodiment, event manager 32 may determine the appropriate interface modules 34 to associate with a class of graphical objects 30 using arrangement 150 of interface modules 34.

In particular, event manager 32 determines the proper type of interface module 34 to associate with the graphical object 30. For example, if the event manager 32 detects that the event is initiated upon a graphical shape 54, then event manager 32 determines that the appropriate type of interface module 34 to associate with the graphical shape 54 is a shape event interface module 34.

Event manager 32 also determines to which classes the graphical object 30 belongs, and selects interface modules 34 of the determined type which may process events for graphical objects 30 of the determined classes. For example, event manager 32 may determine that the graphical shape 54 upon which the event is initiated belongs to a first class that includes all graphical shapes 54 of a first graphical diagram 52 of application 22. The graphical shape 54 may further belong to a second class that includes all graphical shapes 54 of a first document 50 of application 22. The graphical shape 54 may comprise a "process" shape and belong to a third class that includes all "process" shapes of application 22. The graphical shape 54 also belongs to a fourth class that includes all of the graphical shapes 54 of application 22.

With this arrangement of classes for a graphical shape 54, event manager 32 communicates commands 46 to selected interface modules 34, including a first interface module 34 that may generally process shape events for all graphical shapes 54 of the first diagram 52 of application 22, a second interface module 34 that may generally process shape events for all graphical shapes 54 of the first document 50 of application 22, a third interface module that may generally process shape events for all "process" shapes of application 22, and a fourth interface module 34 that may generally process shape events for all graphical shapes 54 of application 22. Commands 46 include suitable information and data used by the selected interface modules 34 to associate with the particular graphical object 30 upon which the event was initiated. In this respect, event manager 32 initiates the association of the appropriate type and scope of interface modules 34 with the graphical object 30.

In one embodiment, the selected interface modules 34 use pointers 36 to associate with the appropriate graphical object 30 in response to commands 46. Each of the selected interface modules 34 associated with the graphical object 30 communicates event information 38 to the appropriate clients 42 using pointer 36 and one or more links 40. Event information 38 defines the event initiated upon the graphical object 30, and may be used by clients 42 as a trigger to execute further instructions, processes, or functions.

After event information 38 is communicated and/or after the event terminates, event manager 32 communicates commands 46 to the appropriate interface modules 34 to initiate dissociating the interface modules 34 from the graphical object 30. In this respect, event manager 32 frees interface modules 34 so that they may communicate event information for later events initiated upon the same or different graphical objects 30. Therefore, system 10 supports dynamically associating and dissociating an interface module 34 with any of the graphical objects 30 of a class to communicate event information 38 to clients 42.

In one embodiment of system 10, a user may create a project 60 having an interface module 34 and a collection of instructions, forms, and modules. The interface module 34 of a project 60 may process events for any scope of graphical objects 30 of a particular type, as determined by the user. The user of system 10 may create, delete, or modify the instructions, forms, and modules of a project 60 to execute in response to selected events initiated upon the determined type and scope of graphical objects 30. In this respect, a user of system 10 may customize the behavior of a class of graphical objects 30.

Figure 2:
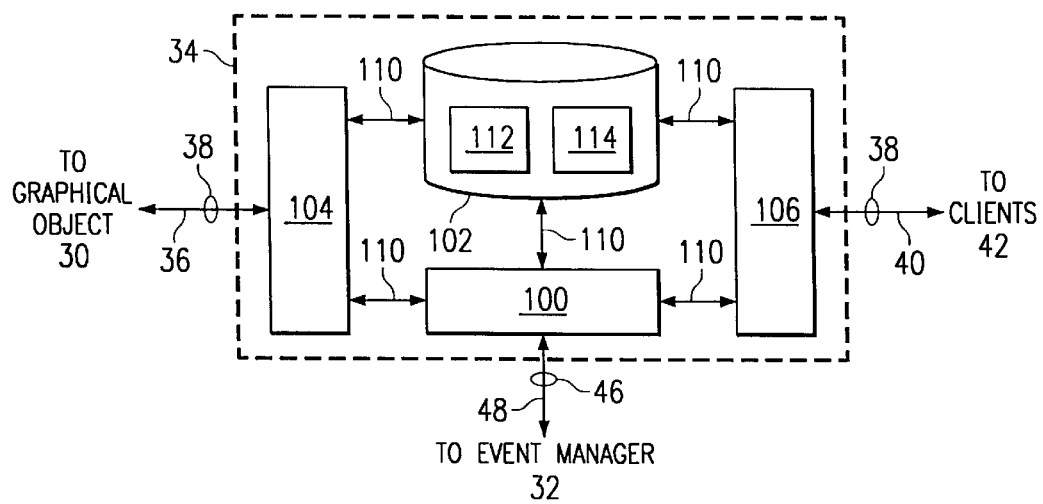
FIG. 2 illustrates one embodiment of an interface module that may be used in the system.

FIG. 2 illustrates one embodiment of an interface module 34 that may be used in system 10. Interface module 34 includes a controller 100 coupled to a memory 102, a first interface 104, and a second interface 106 using links 110. In general, interface module 34 supports communicating event information 38 from an associated graphical object 30 to one or more clients 42.

Controller 100 comprises any suitable combination of hardware and/or software components to receive commands 46 from event manager 32 and, in response, to coordinate the activities of memory 102 and interfaces 104 and 106. In one embodiment of interface module 34, controller 100 includes program instructions and related data to condition, encode, reformat, or otherwise process event information 38. Although controller 100 is illustrated integral to a particular interface module 34, controller 100 may be distributed among multiple interface modules 34 and/or event manager 32.

Memory 102 comprises a file, a stack, or any other suitable organization of volatile or non-volatile memory that stores an association log 112 and a client roster 114. As described in detail below, an interface module 34 may process nested events initiated during the execution of a primary event. Association log 112 includes information and data for each of the different graphical objects 30 with which interface module 34 associates during each of these events. Client roster 114 includes information and data for each client 42 of the interface module 34. Interface module 34 establishes and maintains links 40 according to client roster 114. Client roster 114 may be updated to reflect the current relationship between interface module 34 and clients 42. For example, if interface module 34 severs relationships with particular clients 42, then controller 100 removes those clients 42 from client roster 114.

Interface 104 comprises the appropriate program instructions and related data to associate interface module 34 with the appropriate graphical object 30 using pointer 36 in response to information and data included in commands 46 and the coordination efforts of controller 100. Interface 104 communicates to memory 102 the referencing, linking, and addressing information of pointer 36, and an identifier of the appropriate graphical object 30, for storage in log 112. Interface 106 performs multiplexing or demultiplexing functions, data coding or decoding functions, protocol conversions, device or network interfacing, or any other appropriate processing to establish links 40 according to client roster 114 and to communicate event information 38 to clients 42.

In operation, interface module 34 dissociates from graphical objects 30 until an event is initiated. In response to commands 46 communicated by event manager 32 indicating the initiation of an event, interface module 34 associates with the graphical object 30 upon which the event is initiated. Interface module 34 communicates event information 38 for this "primary" event to clients 42 using pointer 36 and link 40. Clients 42 may execute one or more sets of instructions, processes, or functions in response to event information 38. Interface module 34 dissociates from the graphical object 30 in response to commands 46 indicating the termination of the event.

In a particular aspect of operation, interface module 34 may communicate event information 38 for multiple "nested" events initiated during the execution of a primary event. For example, during the execution of a primary event, a client 42 of interface module 34 may execute a function that initiates a nested event. Alternatively, a user may initiate a nested event during the execution of a primary event.

The nested event may be initiated upon the same graphical object 30 to which interface module 34 is associated. In this case, interface module 34 remains associated with the graphical object 30 and communicates event information 38 defining the nested event until the nested event terminates, at which time interface module 34 resumes communication of event information 38 defining the primary event.

The nested event may also be initiated upon a different graphical object 30 belonging to a class of graphical objects 30 which events may be processed by interface module 34. In this case, interface module 34 stores in association log 112 reference information for pointer 36, identification information for the graphical object 30 upon which the primary event is initiated, and any other suitable information which may be used to associate interface module 34 with the graphical object 30 upon which the primary event initiated. Interface module 34 then dissociates from the graphical object 30 upon which the primary event initiated, and associates with the graphical object 30 upon which the nested event initiated. Interface module 34 communicates event information 38 for the nested event to clients 42 and dissociates from the graphical object 30 upon which the nested event is initiated upon the termination of the nested event. At this time, interface module 34 uses the information stored in association log 112 to reassociate with the graphical object 30 upon which the primary event initiated, and resumes communicating event information 38 defining the primary event until the primary event terminates.

In this respect, interface module 34 may process any number and combination of nested events initiated during the execution of a primary event. A particular advantage provided by this aspect of system 10 is that by processing nested events, interface module 34 facilitates the execution of enhanced instructions, processes, or functions by clients 42. For example, a client 42 of an interface module 34 may execute a set of instructions that initiate one or more nested events to perform a complex set of tasks, such as to identify a database, to retrieve data from the database, and to insert the data in a file. The accurate and complete performance of these tasks may depend upon the processing of the nested events prior to the completion of the primary event. Therefore, by processing nested events, the interface modules of the present invention facilitate the execution of complex tasks.

Figure 3:
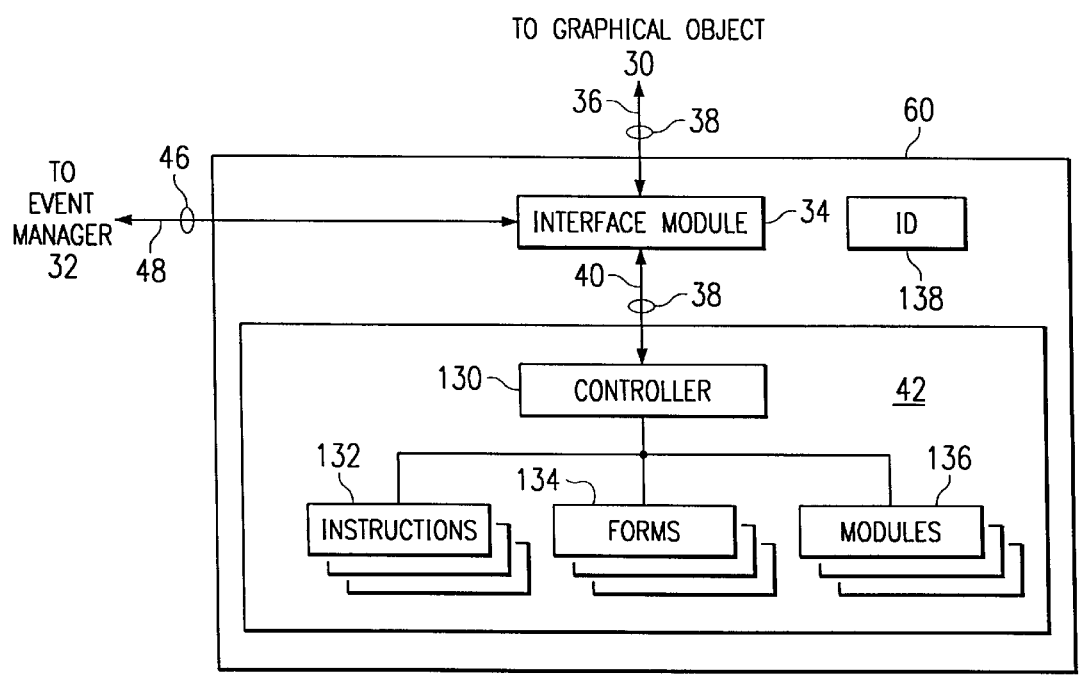
FIG. 3 illustrates one embodiment of a project for a graphical object of the system.

FIG. 3 illustrates one embodiment of a project 60 that includes an interface module 34 coupled to a client 42. As described above with reference to FIG. 1, an interface module 34 includes any suitable combination of program instructions, interfaces, memory, and related data to associate with a graphical object 30, to communicate event information 38 defining an event initiated upon the graphical object 30, and to dissociate from the graphical object 30 in response to commands issued by event manager 32. As illustrated in FIG. 3, interface module 34 may perform these functions on behalf of a project 60. A user of system 10 may determine the type and scope of graphical objects 30 which events are processed by interface module 34 of project 60 using the graphical user interface described in more detail with reference to FIG. 5.

Client 42 comprises a controller 130 coupled to interface module 34, instructions 132, forms 134, and modules 136. Controller 130 comprises any suitable combination of hardware and/or software components to determine the appropriate instructions 132 to execute based upon event information 38 received from interface module 32. Instructions 132 comprise code, processes, or functions that execute in response to the particular events defined by event information 38. For example, instructions 132 may comprise a first set of code that executes in response to a first event initiated upon an appropriate class of graphical objects 30 (e.g. "double click" event), and a second set of code that executes in response to a second event initiated upon the class of graphical objects 30 (e.g. "resize" event). In this respect, instructions 132 comprise "event-driven" code. A user of system 10 may create, delete or modify instructions 132 using the GUI described in more detail with reference to FIG. 6.

Figure 9:
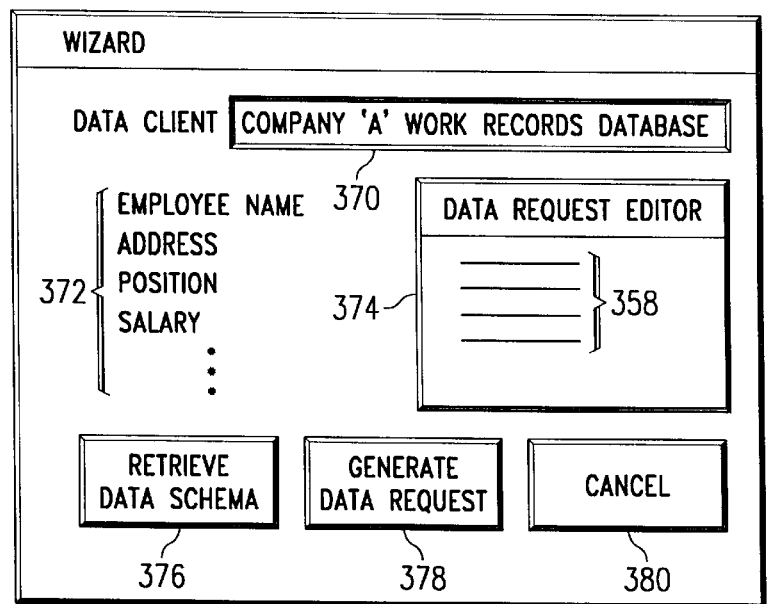
FIG. 9 illustrates one embodiment of a form presented to a user of the system to support processing data for a graphical object.

Forms 134 comprise any suitable number and combination of wizards, templates, charts, tables, or documents that may be presented to a user of system 10 to display and/or collect data using any suitable GUI of application 22, such as the GUI illustrated in FIG. 9. In one embodiment, the presentation of forms 134 may be initiated by the execution of particular instructions 132. Information collected by a form 134 may be stored in a suitable organization and location of memory 18, communicated to any suitable external memory or application of system 10, and/or used as a parameter for instructions 132.

Modules 136 comprise a set of instructions 132 that may be arranged in a modular fashion to perform defined functions. For example, a first module 136 may perform a data processing function for a graphical object 30, as described in more detail with reference to FIGS. 8–10, and a second module 136 may present adjustment controls operated by a user of system 10 to adjust the color, geometry, or other graphical representation of a graphical object 30, as described in more detail with reference to FIGS. 10A–10C.

Project 60 further comprises an identifier 138. Identifier 138 comprises a name, a number, an address, or any other suitable indicator that uniquely identifies a particular project 60 to the various components of system 10.

FIGS. 4A–4C illustrate an arrangement 150 of interface modules 34 used to process events for graphical objects 30. Graphical objects 30 represented by rows 152 include documents 50, graphical diagrams 52, graphical shapes 54, graphical connectors 56, or any selected subsets thereof. For example, a first subset of graphical shapes 54 may include "process" shapes, and a second subset of graphical shapes 54 may include "decision" shapes. Similarly, a first subset of graphical diagrams 52 may include "flowchart" diagrams, and a second subset of graphical diagrams 52 may include "organizational" diagrams. A user of system 10 may arrange in subsets any number and combination of graphical objects 30 of a particular type to customize the classes of graphical objects 30 which events are processed by interface modules 34. Columns 154 of arrangement 150 indicate the scope of graphical objects 30 which events are processed by interface modules 34.

The combination of rows 152 and columns 154 define different classes of graphical objects 30 upon which particular interface modules 34 operate. In particular, entries 160–176 define the type and scope of interface modules 34 used to process events for graphical objects 30 of a corresponding type and scope. For example, entry 160 defines one or more interface modules 34 that process events for all or a selected subset of graphical shapes 54 of application 22. Entry 162 defines one or more interface modules 34 that process events for all or a selected subset of graphical shapes 54 of a particular document 50 of application 22. Entry 164 defines one or more interface modules 34 that process events for all or a selected subset of graphical shapes 54 of a particular graphical diagram 52 of application 22.

Similarly, entries 166, 168, and 170 define one or more interface modules 34 that process events for all or a selected subset of graphical connectors 56 of application 22, events for all or a selected subset of graphical connectors 56 of a particular document 50, and events for all or a selected subset of graphical connectors 56 of a particular diagram 52, respectively. Entries 172 and 174 define one or more interface modules 34 that process events for all or a selected subset of graphical diagrams 52 of application 22, and events for all or a selected subset of graphical diagrams 52 of a particular document 50, respectively. Entry 176 defines one or more interface modules 34 that processes events for all or a selected subset of documents 50 of application 22. Therefore, each entry of arrangement 150 may define one or more interface modules 34 based upon the categorization of documents 50, graphical diagrams 52, graphical shapes 54, and graphical connectors 56.

FIG. 4B illustrates one embodiment of entry 162 of arrangement 150. Entry 162 identifies the particular interface modules 34 used to process events of all or a selected subset of graphical shapes 54 of documents 50. For example, subentry 180 generally identifies the interface modules 34 that process events for all or a selected subset of graphical shapes 54 of a first document 50 of application 22. Similarly, subentry 184 generally identifies the interface modules 34 that process events for all or a selected subset of graphical shapes 54 of an $n^{th}$ document 50 of application 22. Each of entries 168 and 174 of arrangement 150 include similar subentries that generally identify interface modules 34 for graphical connectors 56 and graphical diagrams 52, respectively, with particular documents 50 of application 22.

FIG. 4C illustrates one embodiment of entry 164 of arrangement 150. Entry 164 identifies the particular interface modules 34 used to process events of all or a selected subset of graphical shapes 54 of graphical diagrams 52. For example, subentry 190 generally identifies the interface modules 34 that process events for all or a selected subset of graphical shapes 54 of a first graphical diagram 52 of application 22. Similarly, subentry 194 generally identifies the interface modules 34 that process events for all or a selected subset of graphical shapes 54 of an $n^{th}$ graphical diagram 50 of application 22. Entry 170 of arrangement 150 includes similar subentries that generally identify interface modules 34 for graphical connectors 56 with particular graphical diagrams 52 of application 22.

In one embodiment, event manager 32 selects particular interface modules 34 to associate with a graphical object 30 upon which an event is initiated based upon the arrangement 150 of interface modules 34 illustrated in FIGS. 4A–4C. In particular, based upon the type of graphical object 30 upon which an event is initiated (as indicated by rows 152), and the classes to which the determined type of graphical object 30 belongs (as indicated by columns 154), event manager 32 selects one or more interface modules 34 (as indicated by entries 160–176) to associate with the graphical object 30. In another embodiment of system 10, event manager 32 spawns the appropriate interface modules 34 to associate with a graphical object 30 based upon the classes to which graphical object 30 belongs, as indicated by arrangement 150.

Although the description of FIGS. 4A–4C is detailed with reference to an arrangement 150 of interface modules 34, it should be understood that any of the interface modules 34 in arrangement 150 may be arranged in a project 60. Therefore, one of skill in the art can appreciate that projects 60 may also be organized according to arrangement 150. Furthermore, an event manager 32 may dynamically associate and dissociate an interface module 34 of a project 60 with a graphical object 30 according to arrangement 150.

Figure 5:
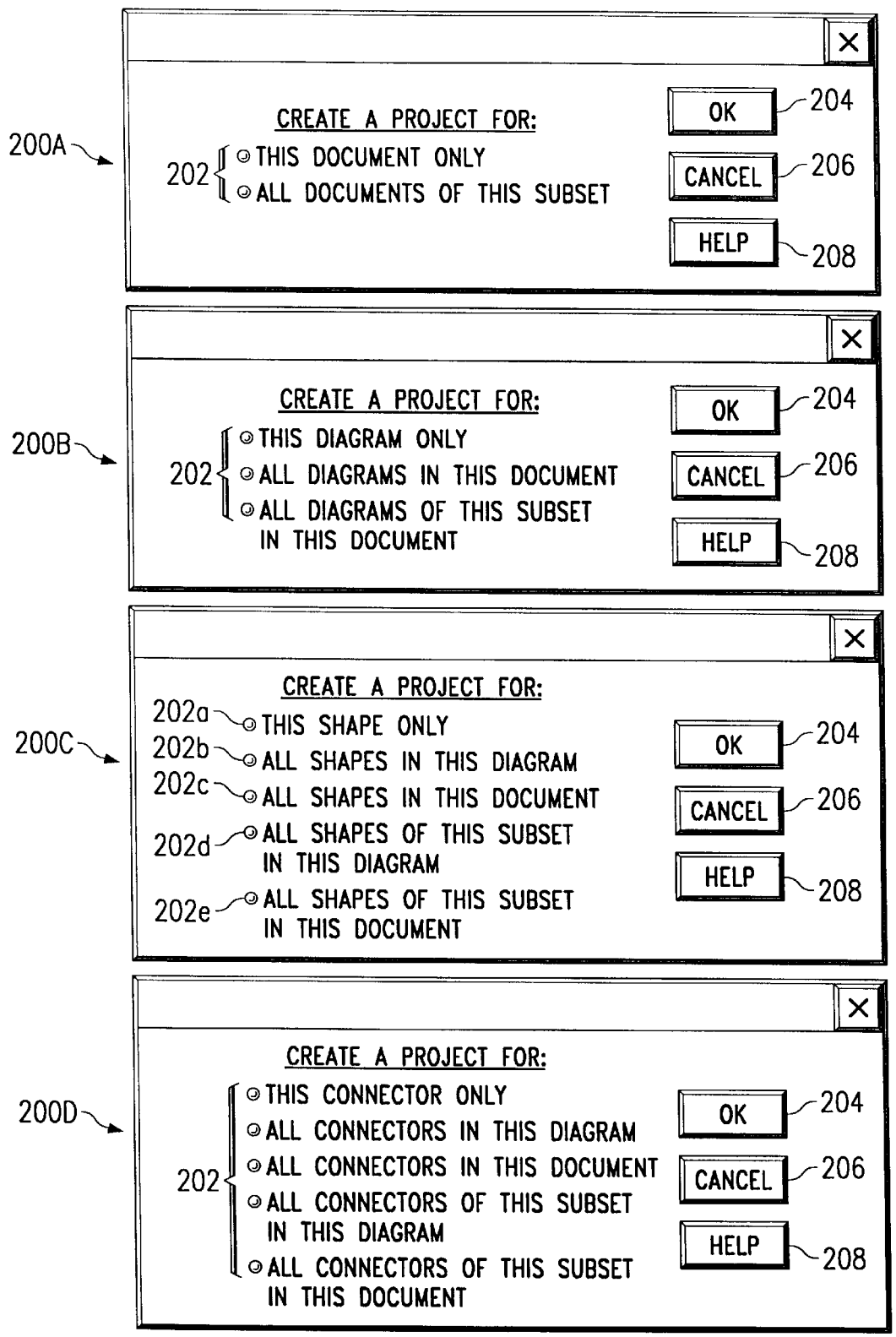
FIG. 5 illustrates several embodiments of a first graphical user interface that may be used in the system.

FIG. 5 illustrates exemplary embodiments of GUIs 200A–200D operated by a user of application 22 to create a project 60 for a defined class of graphical objects 30. Although the description of GUIs 200A–200D is detailed with reference to defining a class of graphical objects 30 to determine the applicable scope of a project 60, application 22 may present similar interfaces to determine the applicable scope of an interface module 34 even if it is not arranged in a project 60. A GUI 200 generally includes a collection of options 202, an "OK" button 204, a "Cancel" button 206, and a "Help" button 208. Options 202 comprise terms and conditions selected by a user to define a class of graphical objects 30 for the project 60. Application 22 presents a GUI 200A to support creating a document project 60 defined by a scope of documents 50. Similarly, application 22 presents GUIs 200B–200D to support creating a diagram project 60, a shape project 60, and a connector project 60 defined by a scope of graphical diagrams 52, graphical shapes 54, and graphical connectors 56, respectively.

In operation, application 22 presents a user of system 10 with a selected one of the GUIs 200A–200D in response to any suitable user activity indicating a request to create a project 60. For example, a user may indicate a request to create a shape project 60 for a particular graphical shape 54 by selecting, activating, or otherwise identifying the shape 54 in system 10. The graphical shape 54 for which project 60 is created is generally referred to as the selected graphical shape 54. The following description of FIG. 5 details the creation of a shape project 60 for a selected graphical shape 54 using GUI 200C.

Referring in particular to GUI 200C, a user may select any one of options 202a–202e to define a class of graphical shapes 54 for the shape project 60. For example, option 202a labeled "This Shape Only" supports creating a shape project 60 defined by a class of graphical shapes 54 including only the selected graphical shape 54 identified by the user. Option 202b labeled "All Shapes In This Diagram" and option 202c labeled "All Shapes In This Document" support creating shape projects 60 defined by a class of all graphical shapes 54 in the instant graphical diagram 52, and in the instant document 50, respectively. Options 202d and 202e support creating shape projects 60 defined by a class of graphical shapes 54 of a particular subset to which the selected graphical shape 54 belongs. For example, if the selected graphical shape 54 is a "process" shape 54, then option 202d labeled "All Shapes of this Subset in this Diagram" supports creating a shape project 60 defined by a class of graphical shapes 54 that includes all "process" shapes in the instant graphical diagram 52. Similarly, if the selected graphical shape 54 is a "process" shape 54, then option 202*e* labeled "All Shapes of this Subset in this Document" supports creating a shape project 60 defined by a class of graphical shapes 54 that includes all "process" shapes in the instant document 50.

A user may activate "OK" button 204 to create a project 60 defined by the class of graphical objects 30 determined by the selection of options 202. The user may activate "Cancel" button 206 to exit GUI 200 without creating a project 60. The user may further activate a "Help" button 208 to view more information regarding the class of graphical objects 30 that a particular option 202 may define. Therefore, application 22 presents GUIs 200 to a user of system 10 to create projects 60 defined by a class of graphical objects 30.

Figure 6:
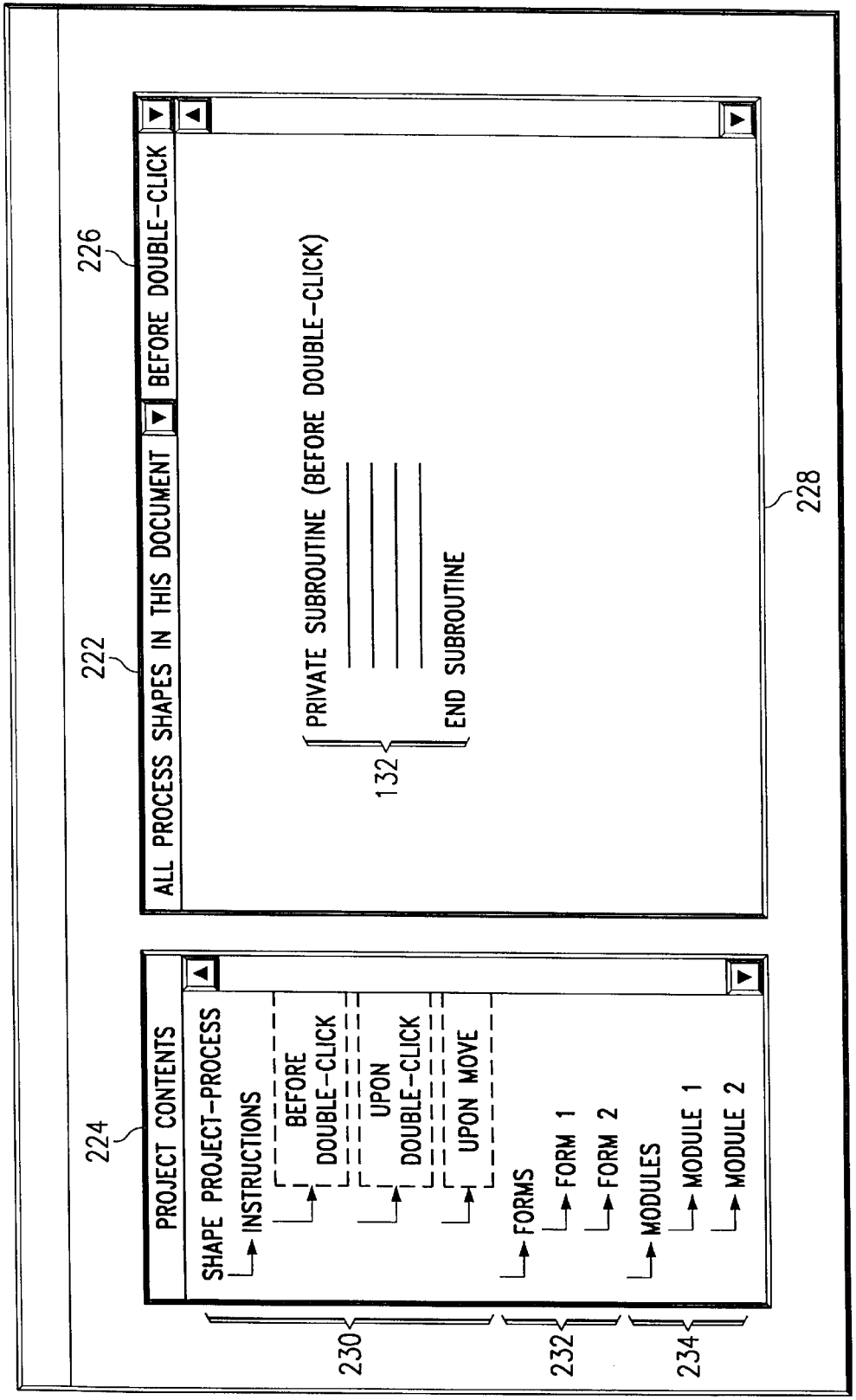
FIG. 6 illustrates one embodiment of a second graphical user interface that may be used in the system.

FIG. 6 illustrates one embodiment of a GUI 220 operated by a user of application 22 to modify a project 60 and, in particular, to customize the behavior of the class of graphical objects 30 which define the project 60. In general, GUI 220 presents a project menu 222, a project contents window 224, an event menu 226, and an editor 228. System 10 presents GUI 220 in response to the creation of a new project 60 or the indication of a request by a user to edit an existing project 60.

Project menu 222 comprises any suitable graphical menu, such as a pull-down menu, that identifies a project 60 with regard to the class of graphical objects 30 which define the project 60 and which behavior a user may customize using GUI 220. GUI 220 illustrated in FIG. 6, for example, supports customizing the behavior of all "process" shapes 54 in the instant document 50. The project 60 identified by project menu 222 is generally referred to as the identified project 60.

Application 22 may present a GUI 220 in response to the creation of a new project 60. In this case, project menu 222 identifies by default the new project 60, and a user may customize the behavior of the class of graphical objects 30 defining the new project 60 using GUI 220. Application 22 may also present a GUI 220 in response to a request to modify an existing project 60. In this case, a user may select one of a plurality of existing projects 60 from project menu 222 and use GUI 220 to customize the behavior of the class of graphical objects 30 defining the selected project 60. In this regard, a user of GUI 220 may customize the behavior of a class of graphical objects defining a newly created project 60 or an existing project 60.

Project contents window 224 organizes the contents of a project 60 for presentation to the user, and includes instruction contents 230, form contents 232, and module contents 234. Instruction contents 230 comprise the instructions 132 associated with the identified project 60. As described above with reference to FIG. 3, instructions 132 comprise code, processes, or functions that execute in response to particular events initiated upon graphical objects 30. In one embodiment, instruction contents 230 comprise instructions 132 indexed by the event that triggers their execution. For example, instructions 132 that execute in response to the initiation of a "Before Double-Click" event may be indexed by that event in instruction contents 230.

Form contents 232 comprise the forms 134 associated with the identified project 60. Forms 134 comprise any suitable number and combination of wizards, templates, charts, tables, or documents that may be presented to a user of system 10 to display and/or collect data using any suitable GUI of application 22. Module contents 234 comprise the modules 136 associated with the identified project 60. Modules 136 comprise a set of instructions 132 that may be arranged in a modular fashion to perform defined functions.

Event menu 226 comprises any suitable graphical menu, such as a "pull-down" menu, that presents a list of events that may be initiated upon the class of graphical objects 30 defining the identified project 60. In the example illustrated by GUI 220 of FIG. 6, event menu 226 presents a list of the events that may be initiated upon graphical shapes 54. Editor 228 comprises any suitable interface or window that enables a user of GUI 220 to write and/or edit instructions 132 for the identified project 60.

In operation, a user may select a project 60 to modify from project menu 222 of GUI 220. For example, a user may choose to modify a new project 60 created using GUI 200 illustrated in FIG. 5, or any of a number of existing projects 60 listed in menu 222. Once a project 60 is selected, a user may modify contents 230, 232, and 234 of GUI 220 to customize the behavior of the class of graphical objects 30 defining the identified project 60.

In one embodiment, a user may select an event from event menu 226 and, using editor 228, write new instructions 132 and/or edit existing instructions 132 that execute in response to the selected event. For example, the user may select an event from menu 226, such as the "Before Double-Click" event and, in response, editor 228 presents a framework of instructions 132, such as a "header" and "footer" of instructions 132, associated with the selected event. The user may then write the body of instructions 132 which execute in response to the "Before Double-Click" event. Alternatively, a user may select existing instructions 132 indexed by event in instruction contents 230 and, in response, editor 228 presents the selected instructions 132. The user may then add new instructions 132 or modify existing instructions 132 which execute in response to the event by which the instructions 132 are indexed. In this regard, the user may associate the execution instructions 132 with particular events to customize the behavior of a class of graphical objects 30 defining the identified project 60.

A user may similarly select modules 136 from module contents 234 and modify the instructions 132 of the selected module 136 using editor 228. For example, a user may write or edit instructions 132 arranged in a module 136 to perform a data processing function, as described in more detail with reference to FIGS. 8–9, or to present adjustment controls operated by a user to adjust the color, geometry, or other graphical representation of a graphical object 30, as described in more detail with reference to FIGS. 10A–10C.

Figure 7:
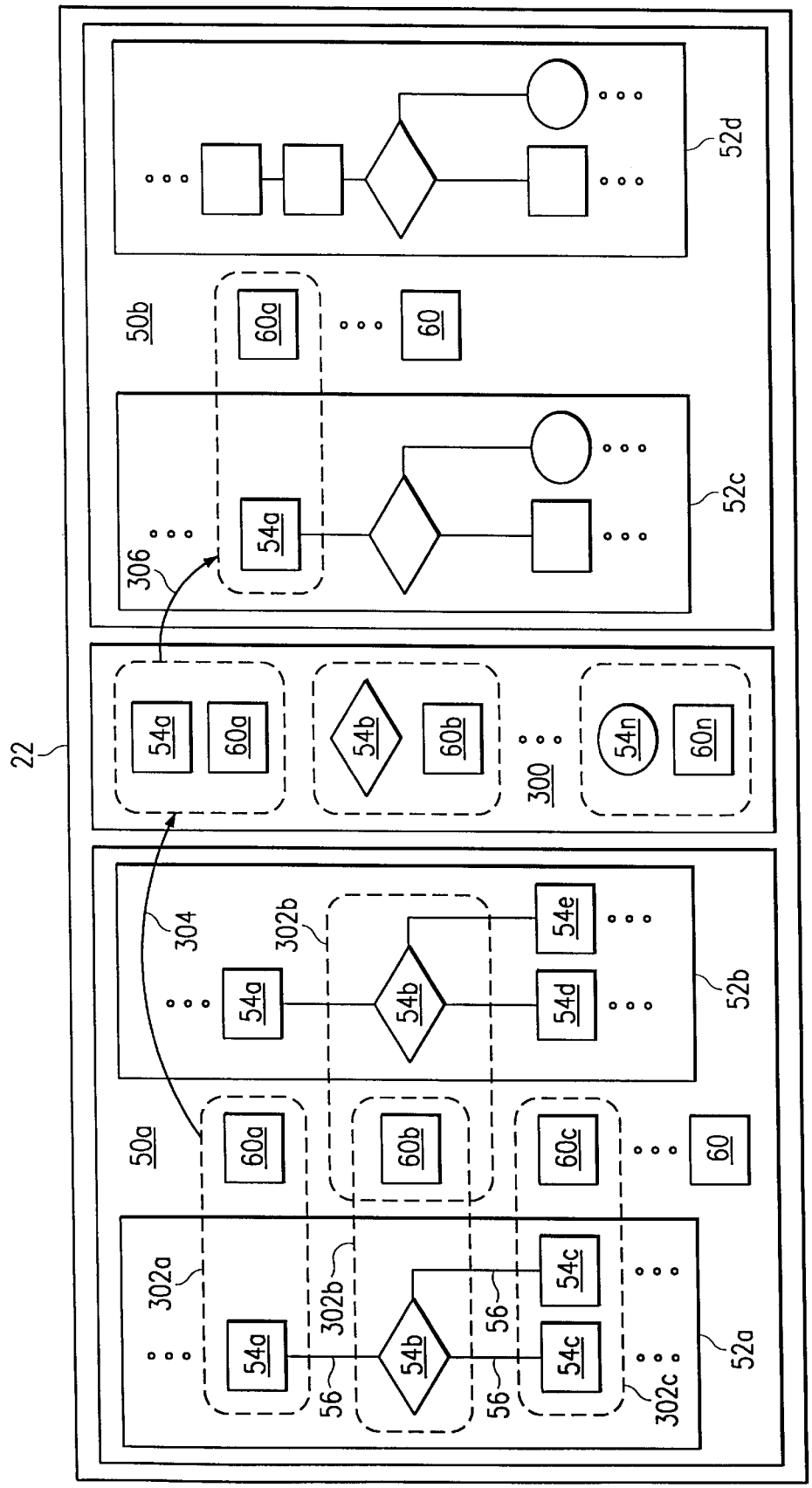
FIG. 7 illustrates one embodiment of an application operating in the system.

FIG. 7 illustrates one embodiment of application 22 operating on system 10 that includes documents 50, graphical diagrams 52, graphical shapes 54, graphical connectors 56, projects 60, and a shape palette 300. In general, projects 60 comprise an interface module 34 to associate with and process events for a particular type and scope of graphical objects 30, and clients 42 that include a collection of instructions, forms, and modules that execute to control the behavior of the associated graphical objects 30. The following description of FIG. 7 is detailed with reference to shape projects 60 for illustrative purposes only and it should be understood that system 10 supports document projects 60, diagram projects 60, and connector projects 60 to process events for and customize the behavior of varying scopes of documents 50, graphical diagrams 52, and graphical connectors 56, respectively.

Shape palette 300 comprises a collection of graphical objects 30 and associated projects 60 that may be shared among documents 50 by users of system 10. For example, a user of system 10 may select a graphical shape 54 from shape palette 300 and insert a copy of the selected graphical shape 54 and the associated shape project 60 into one or more documents 50 of application 22. The operation of the inserted graphical shape 54 is controlled by the instructions, forms, and modules of the associated shape project 60. In this respect, shape palette 300 acts as a repository of graphical objects 30 and associated projects 60 that may be shared by users of system 10.

In operation, a user of system 10 may arrange graphical shapes 54 in graphical diagrams 52a and 52b of document 50a. The user may create a shape project 60 for each new graphical shape 54, or may modify a shape project 60 for an existing shape 54 using the GUIs described with reference to FIGS. 5 and 6. The user may determine the applicability of a shape project 60 to limit its association to any particular instance of a shape 54, to share it with a subset of shapes 54 in one or more graphical diagrams 52, or to share it with a subset of graphical shapes 54 in one or more documents 50. In this respect, a shape project 60 may control the operation of any of a subset of graphical shapes 54, as determined by the user.

Referring to graphical diagram 52a of FIG. 7, for example, shape project 60a controls the operation of graphical shape 54a, which may be a particular instance of a "process" shape 54. The operation of other "process" shapes 54, such as, graphical shapes 54c, may be controlled by other shape projects 60, such as shape project 60c. The association between shape project 60a and graphical shape 54a is represented by the dashed circle 302a. The associations between shape project 60c and graphical shapes 54c are represented by the dashed circle 302c. In this respect, shape projects 60 may associate with a particular instance of a graphical shape 54 or with a subset of graphical shapes 54 in a particular graphical diagram 52.

In another example, a user may generate a shape project 60b that controls the operation of graphical shapes 54b, which may be a particular instance of "decision" shapes 54, in each of graphical diagrams 52a and 52b. The association between shape project 60b and graphical shapes 54b is represented by dashed circles 302b. In this respect, shape projects 60 may associate with a subset of graphical shapes 54 found in multiple graphical diagrams 52 of a particular document 50.

To control the operation of a subset of graphical shapes 54 in a particular document 50, a copy of the shape project 60 is stored in a folder, file, stack, or any other suitable organization of memory associated with the particular document 50. For example, a copy of each of shape projects 60a, 60b, and 60c, which control the operation of shapes 54a, 54b, and 54c of document 50a, respectively, may be stored in a folder associated with document 50a. In this respect, document 50a and each of its diagrams 52, shapes 54, connectors 56, and projects 60 form an autonomous unit.

In one aspect of operation, a user of system 10 may share a graphical shape 54 and an associated shape project 60 with other users of system 10 using shape palette 300. Shape palette 300 stores copies of graphical shapes 54 and associated shape projects 60 for insertion into any other document 50 of application 22 by any other user of system 10.

For example, a user of system 10 may create graphical shape 54a and shape project 60a in document 50a of application 22, as illustrated in FIG. 7. The user may then "drag" a copy of shape 54a and project 60a to shape palette 300 for storage, as indicated by arrow 304. The copies of graphical shapes 54 and the associated shape projects 60 stored in shape palette 300 are accessible by other users of system 10. Therefore, any user of system 10 may "drag" a copy of graphical shape 54a and shape project 60a from shape palette 300 to any other document 50 of application 22, such as to document 50b as indicated by arrow 306. A copy of the graphical shape 54a and project 60a inserted in document 50b is stored in a folder, stack, table, or any other suitable organization of memory associated with document 50b, so that document 50b, graphical shape 54a, and the associated shape project 60a form an autonomous unit. In this respect, application 22 supports creating a graphical shape 54 and an associated shape project 60 to control the operation of that shape 54 in a particular document 50 of application 22, and sharing that shape 54 and associated project 60 among other documents 50 of application 22.

In a particular aspect of operation, system 10 maintains current versions of projects 60 copied from shape palette 300 at each document 50 of application 22. For example, if a copy of a project 60 stored in shape palette 300 is updated, such as by modifying instructions 132, forms 134, or modules 136, application 22 updates each copy of the project 60 in documents 50 accordingly. To do so, application 22 identifies each project 60 of a document 50 copied from shape palette 300, using identifiers 138. Upon opening a document 50, after an event time-out, or after any other suitable interval, application 22 determines whether any projects 60 stored in shape palette 300 having identifiers 138 matching those of projects 60 stored in a document 50 have been updated. If so, application 22 overwrites the current copy of that project 60 with an updated copy of that project 60 in the appropriate documents 50. A particular advantage provided by this aspect of operation is that application 22 maintains the integrity and consistency of projects 60 among documents 50 of system 10.

Figure 8:
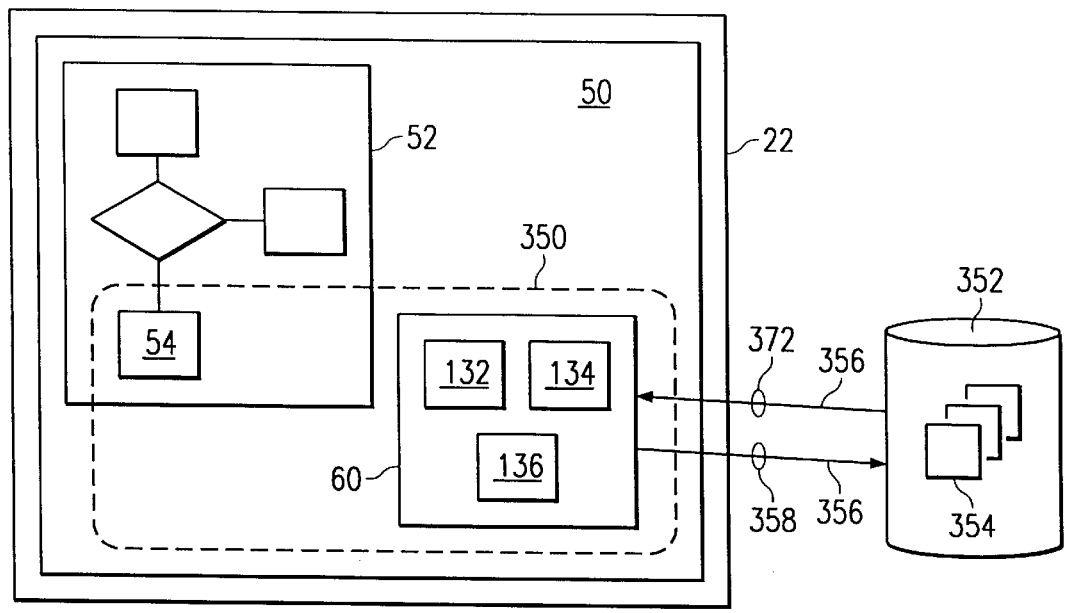
FIG. 8 illustrates an application of a project to process data for a graphical object.

FIG. 8 illustrates an application of a project 60 to process data for a class of graphical objects 30. Although the following description is detailed with reference to instructions 132, forms 134, and modules 136 of a shape project 60, it should be understood that the following features and functions may be implemented using the components of any project 60 for any corresponding type of graphical object 30, including projects 60 for documents 50, graphical diagrams 52, or graphical connectors 56. Application 22 operating in system 10 includes a graphical object 30, such as a graphical shape 54, a project 60 associated with the graphical shape 54, and a data client 352 storing data items 354. The association between project 60 and graphical shape 54 is indicated using a dashed circle 350.

In general, project 60 includes instructions 132 arranged, in one embodiment, in one or more modules 136 that present forms 134 operated by a user to generate a data request 358, and perform data processing functions with data client 352 for graphical shape 54 using data request 358. Modules 136 which perform the data processing functions described herein are generally referred to as data processing modules 136. Data processing modules 136 execute in response to any suitable event selected by a user, for example, from event menu 226 of GUI 220.

Data client 352 comprises a chart, a table, a file, a database, a spreadsheet, another application, or any other suitable source of data items 354 either integral to or remote from application 22. Data items 354 comprise any suitable organization or arrangement of information. In one embodiment, data items 354 comprise information used by instructions 132 to perform a designated task or function. Project 60 accesses data client 352 using a link 356 which comprises an Open Database Connectivity (ODBC) link or any other suitable data link across a global computing network, a virtual private network (VPN), a local area network (LAN), a wide area network (WAN), or any other suitable communication network that facilitates communicating data between project 60 and data client 352. Link 356 supports the communication of data using Structured Query Language (SQL) or any other suitable data manipulation language used to query, to store, or to update the contents of data client 352.

In operation, project 60 spawns a wizard, a template, or any other suitable form 134 for presentation to a user in response to an instantiation of an associated shape 54, a request to modify a data request 358, or any other suitable trigger. Form 134, described in greater detail with regard to FIG. 9, supports generating or editing a data request 358 used to process data items 354 of data client 352. In general, a user identifies a data client 352 using form 134. Project 60 establishes link 356 to the identified data client 352 and determines the data schema 372 of data client 352. Data schema 372 generally identifies the type and structure of data items 354 stored in data client 352, as explained in detail below. The user generates a data request 358 according to data schema 372 of data client 352. Data request 358 comprises an identifier for data client 352, and data parameters and instructions used to query, to store, or to update data items 354 of data client 352. Project 60 stores the data request 358 generated by the user in associated memory indexed, in one embodiment, according to data processing modules 136.

Project 60 executes instructions 132 of a data processing module 136 in response to the initiation of one or more selected events upon an associated graphical shape 54. Data processing module 136 of project 60 processes data items 354 of data client 352 as specified by data request 358. For example, module 136 may retrieve queried data items 354 from data client 352 according to data request 358. Furthermore, module 136 may store or update data items 354 at data client 352 according to data request 358. A project 60 may include one or more data processing modules 136 to perform any number and combination of data processing functions for graphical objects 30.

An advantage provided by this aspect of system 10 is that a user may write instructions 132 of a project 60 to build data processing modules 136 that perform customized data processing functions on behalf of any of a defined class of graphical objects 30. The data processing modules 136 present forms 134 operated by a user to generate a data request 358 that defines the data processing functions to be performed. The data processing modules 136 perform the defined data processing functions in response to the initiation of one or more selected events upon one or more of the associated graphical objects 30. In this respect, data processing modules 136 and data requests 358 may initially be configured by a user and then perform the defined data processing functions without further user intervention. Of course, a user may later update data requests 358 to modify the data processing functions performed by the project 60.

Additional advantages of system 10 include the ability of a user to write instructions 132 that execute to customize the properties or characteristics of an associated class of graphical objects 30 in response to the data items 354 retrieved from data client 352. For example, instructions 132 may execute to modify the color, text, labels, position, geometry, or any other characteristic or appearance of an object 30 in response to data items 354 retrieved from data client 352. Instructions 132 may further execute to update profile information of an associated class of graphical objects 30. For example, if a graphical shape 54 represents a person in an organizational diagram 52, then a project 60 may modify profile information (e.g., name, address, telephone number, position, salary, etc.) associated with that person in response to data items 354 retrieved from data client 352. In another example, instructions 132 may execute to generate reports, such as reports regarding the characteristics or properties of graphical objects 30, using all or a portion of the data items 354 retrieved from data client 352.

A user of system 10 may further write instructions 132 that execute to present in a graphical format the contents of a data client 352. For example, instructions 132 may execute to generate graphical objects 30, such as a graphical diagram 52, that graphically represents the data schema 372 of a data client 352. An advantage of presenting to a user of system 10 a data schema 372 in a graphical format is that the user may then visualize and, therefore, better understand the type and structure of data items 354 stored in a data client 352. By understanding the data schema 372 of a data client 352, a user of system 10 may generate a more effective data request 358. Another advantage provided by this aspect of system 10 is that a user may more effectively map the type and structure of data items 354 stored in one data client 352, such as a legacy data system, into the appropriate type and structure of data items 354 in another data client 352. Instructions 132 may further execute to generate one or more graphical objects 30, such as a graphical diagram 52, that graphically represents to a user of system 10 the data items 354 retrieved from data client 352. For example, instructions 132 may generate an organizational diagram 52 that represents the hierarchy of an organization based upon data items 354 retrieved from data client 352. In this regard, a system 10 may present the retrieved data items 352 in a graphical format.

FIG. 9 illustrates one embodiment of a form 134 presented to the user to support processing data for a graphical object 30. Form 134 includes a data client identifier field 370, data schema 372, data request editor 374, a "Retrieve Data Schema" button 376, a "Generate Data Request" button 378, and a "Cancel" button 380. A user inputs a name, an address, or some other unique identifier of data client 352 in field 370 and activates "Retrieve Data Schema" button 376. Project 60 establishes communication link 356 with the identified data client 352 using the information entered in field 370, and determines the data schema 372 of data client 352. Data schema 372 conveys the type and structure of data items 354 stored in data client 352 and is presented so that a user may build a data request 358 consistent with the type and structure of data items 354 stored in data client 352. Form 134 illustrated in FIG. 9 presents an exemplary data schema 372 (e.g. Employee Name, Address, Position, Salary, etc.) for a particular data client 352 (e.g. Company 'A' Work Records Database).

Form 134 presents data request editor 374. Data request editor 374 comprises any suitable interface or window that enables a user of form 134 to write and/or modify data request 358. A user generates a data request 358 by entering data parameters and/or instructions in editor 374 using any suitable data manipulation language, such as SQL. For example, a user may generate a data request 358 that queries, stores, or updates data items 354 of data client 352. A user activates "Generate Data Request" button 378 to generate a data request 358 based upon the parameters and instructions entered in editor 374. In one embodiment, data request 358 is stored in memory associated with project 60. In a particular embodiment, data request 358 is stored in project 60 indexed by an associated data processing module 136. This allows project 60 to execute the proper data request 358 in response to initiated events. A user may cancel the data request 358 by activating "Cancel" button 378.

FIGS. 10A–10C illustrate an application of projects 60 to adjust the color, geometry, or other graphical representation of an associated graphical object 30. Although the following description is detailed with reference to adjusting the graphical representation of graphical shapes 54, it should be understood that projects 60 may also be implemented to adjust the graphical representation of documents 50, graphical diagrams 52, and graphical connectors 56. In general, application 22 includes a project 60 and an associated class of graphical objects 30, such as graphical shapes 54, defined by a user for project 60 using GUI 200, as described above.

In general, project 60 includes instructions 132 arranged, in one embodiment, in one or more modules 136 that present adjustment controls 400 and are generally referred to as adjustment control modules 136. Adjustment controls 400 comprise control points operated by a user of system 10 to adjust graphical or other data for any of a class of graphical objects 30 associated with project 60. A user of system 10 may generate any number and combination of adjustment control modules 136 in a project 60 to present any number and combination of adjustment controls 400 for the associated class of graphical objects. A user may write instructions 132 in adjustment control modules 136 that execute to adjust the graphical representation of graphical objects 30 in a manner defined by the user in response to the initiation of selected events upon adjustment controls 400.

Referring in particular to FIG. 10A, a user may write adjustment control modules 136 in a project 60 to present a color adjustment control 400a. Color adjustment control 400a comprises a control point that adjusts the color of one or more of an associated class of graphical shapes 54 as control 400a is moved, for example, along an edge of a graphical shape 54. The user may write instructions 132 in a module of 136 to define the path along which a color adjustment control 400a may be moved, such as, for example, between the left and right boundaries or the top and bottom boundaries of a graphical shape 54. The user may write further instructions 132 in a module 136 to determine the spectrum of colors to which graphical shapes 54 may be adjusted. A user may write other modules 136 to generate similar adjustment controls 400 that adjust the tone, shading, hue, granularity or other similar graphical characteristics of a shape 54.

Referring now to FIG. 10B, a user may write adjustment control modules 136 in a project 60 to present a gauge adjustment control 400b. Gauge adjustment control 400b comprises a control point that adjusts a value displayed in one or more of an associated class of graphical shapes 54 to represent the corresponding fill capacity of the graphical shapes 54 as control 400b is moved along a path defined by the user. The path along which gauge adjustment control 400b is moved may comprise, for example, an edge of a graphical shape 54.

Referring now to FIG. 10C, a user may write adjustment control modules 136 in project 60 to present a geometric adjustment control 400c. Geometric adjustment control 400c comprises a control point that adjusts the geometric representation of one or more of an associated class of graphical shapes 54 as control 400c is moved along a path defined by the user. For example, a user may write instructions 132 in a module 136 to present a geometric adjustment control 400c in proximity to a graphical shape 54, such as at one point of a triangle. The user may further write instructions 132 in module 136 that execute to adjust the position of the point of the triangle with respect to the base of the triangle in response to the movement of the geometric adjustment control 400c along a path defined by the user. Although geometric adjustment control 400c is detailed with respect to adjusting the geometry of a triangle, it should be understood that a user may write other adjustment control modules 136 to present other geometric adjustment controls 400c that adjust, for example, the radius of a circle, the length or width of a parallelogram, or any other geometric attribute of any other graphical shape 54.

A particular advantage provided by this aspect of system 10 is that a user may write instructions 132 of a project 60 to build adjustment control modules 136. Adjustment control modules 136 execute to present customized adjustment controls 400 that adjust any graphical characteristic of a graphical object 30 in any manner defined by the user. The graphical characteristics of a graphical object 30 that may be adjusted by a user of system 10 include graphical characteristics beyond those that may be adjusted using standard control points.

Figure 11:
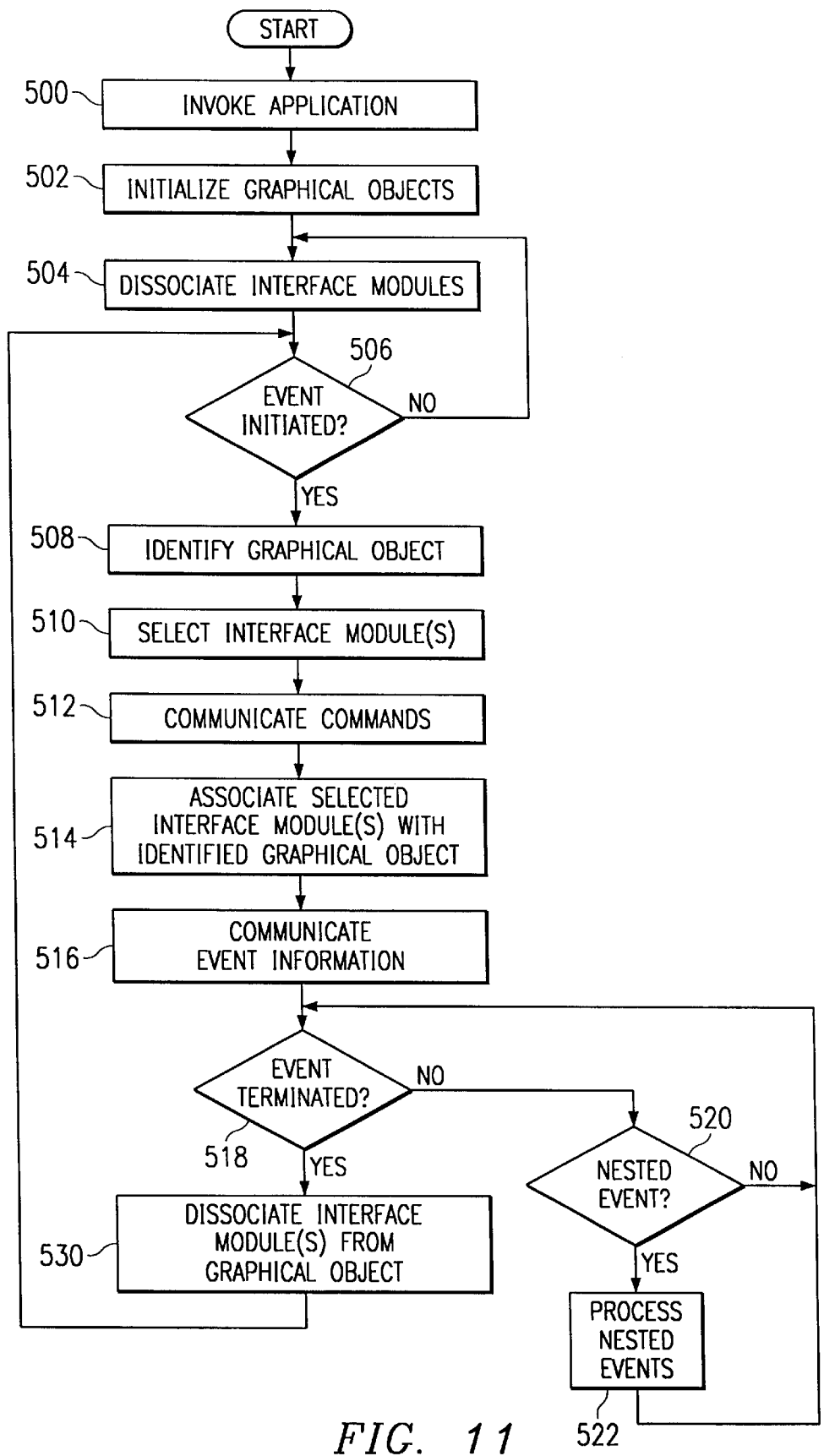
FIG. 11 illustrates a method for processing an event of a graphical object.

FIG. 11 is a flowchart of an exemplary method for processing an event initiated upon a graphical object 30 of application 22. System 10 invokes application 22 at step 500. Application 22 supports dynamically associating and dissociating one or more interface modules 34 with graphical objects 30 to communicate event information 38 to clients 42. Although the following flowchart is described with reference to interface modules 34, it should be understood that an interface module 34 may be arranged in a project 60. Therefore, one of skill in the art can appreciate that the following method to process an event applies to interface modules 34 and projects 60. Application 22 initializes graphical objects 30 at step 502. In one embodiment, application 22 initializes interface modules 34 in accordance with arrangement 150 illustrated in FIGS. 4A–4C. Event manager 32 dissociates each interface module 34 from graphical objects 30 at step 504. Event manager 32 determines whether an event is initiated upon a graphical object 30 at step 506. If no events are initiated, execution returns to step 504.

If an event is initiated upon a graphical object 30 as determined at step 506, event manager 32 identifies the graphical object 30 at step 508. Event manager 32 selects one or more interface modules 34 to associate with the identified graphical object 30 at step 510 based upon the type of graphical object 30 upon which the event is initiated and the classes to which the graphical object 30 belongs using, in one embodiment, the arrangement 150 of interface modules 34 illustrated in FIGS. 4A–4C. Event manager 32 communicates appropriate commands 46 to the selected interface modules 34 at step 512. The selected interface modules 34 associate with the identified graphical object 30 at step 514, and communicate event information 38 to clients 42 at step 516, as described above with reference to FIG. 2.

Event manager 32 determines whether the event initiated upon the graphical object 30 is terminated at step 518. If the event is not terminated, execution proceeds to step 520 where event manager 32 determines whether a nested event is initiated upon the same or different graphical object 30 of application 22. If a nested event is initiated as determined at step 520, execution proceeds to step 522 where the appropriate interface modules 34 process the nested events, as described above with reference to FIG. 2. Upon processing the nested events at step 522 or if a nested event is not initiated upon a graphical object 30 as determined at step 520, execution returns to step 518.

If the event initiated upon the graphical object 30 is terminated as determined at step 518, execution proceeds to step 530 where event manager 32 dissociates each interface module 34 from the graphical object 30. Event manager 32 then returns to step 506 to determine whether another event is initiated upon a graphical object 30. If so, the method processes another event.

Figure 12:
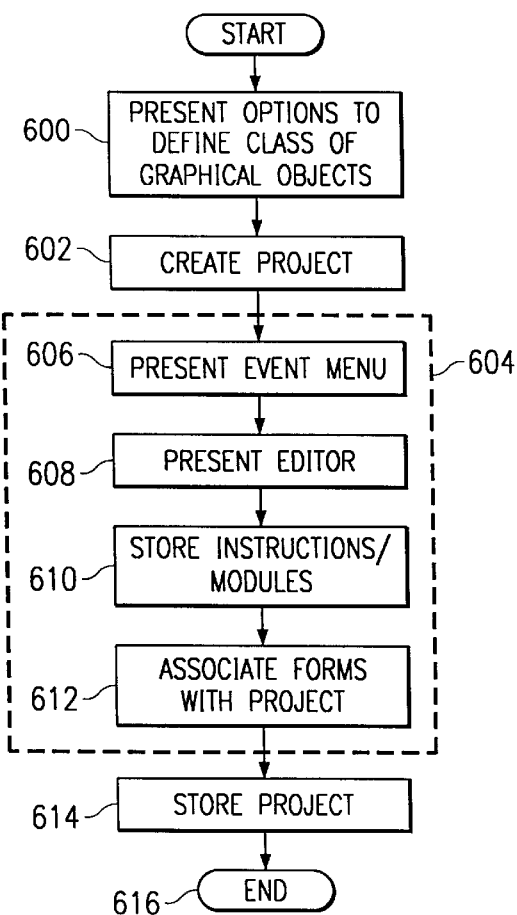
FIG. 12 illustrates a method for creating a project for a graphical object.

FIG. 12 is a flowchart of an exemplary method for creating a project 60 to control the behavior of a class of graphical objects 30. The method begins at step 600 where application 22 presents options 202 of a GUI 200. Options 202 comprise terms and conditions selected by a user to define a class of graphical objects 30 for the project 60. Application 22 may present a different collection of options 202 to support creating a document project defined by a scope of documents 50, a diagram project 60 defined by a scope of graphical diagrams 52, a shape project 60 defined by a scope of graphical shapes 54, and a connector project 60 defined by a scope of graphical connectors 56. Application 22 creates a project 60 defined by the class of graphical objects 30 determined at step 600, at step 602.

Execution proceeds to steps 604 where application 22 supports customizing the components of the project 60 by a user of system 10. In particular, application 22 presents an event menu 226 at step 606 to list the events associated with the defined class of graphical objects 30. Application 22 presents an editor 228 at step 608 to support writing and/or editing instructions 132 for the project 60, and stores the instructions 132 at step 610. In one embodiment, instructions 132 may be arranged in modules 136 to execute defined functions or processes in a modular fashion. Instructions 132 and modules 136 may be arranged in a project contents window 224 indexed by the event that triggers their execution. Application 22 associates forms 134 generated by a user with the project 60 at step 612. Forms 134 may also be arranged in project contents window 224.

Execution proceeds to step 614 where application 22 stores the created project 60. A copy of project 60 is stored in a folder, file, stack, or any other suitable organization of memory associated with the instant document 50. In this respect, a document 50 and each of its diagrams 52, shapes 54, connectors 56, and projects 60 execute as an autonomous unit. In a particular embodiment, application 22 may store a copy of a shape project 60 in a shape palette 300 so that the project 60 may be shared among documents 50 by users of system 10. Execution terminates at step 616.

Figure 13:
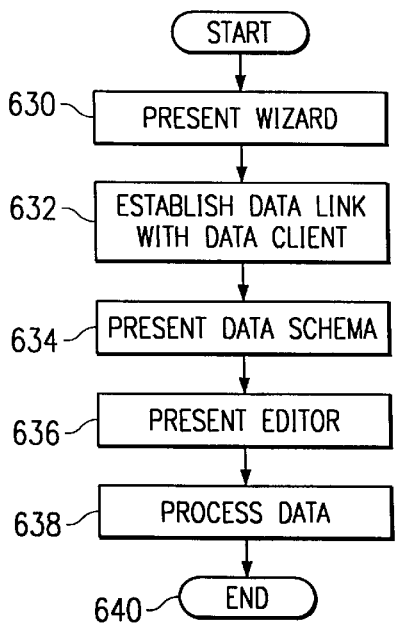
FIG. 13 illustrates a method for processing data for a graphical object.

FIG. 13 is a flow chart of an exemplary method for processing data for a graphical object 30. The method begins at step 630 where a project 60 spawns a wizard, a template, or any other suitable form 134 for presentation to a user in response to an instantiation of an associated shape 54, a request to modify a data request 358, or any other suitable trigger. Form 134 supports generating or editing a data request 358 used to process data items 354 of a data client 352 that is identified by a user in data client identifier field 370. The project 60 establishes a data link 356 with the data client 352 identified in field 370 at step 632. Project 60 presents data schema 372 of data client 352 at step 634. Data schema 372 generally identifies the type and structure of data items 354 stored in data client 352.

Project 60 presents an editor 374 at step 636. Editor 374 is operated by a user to generate a data request 358 that is stored in any suitable organization of memory at project 60. Project 60 processes data items 354 according to data request 358 at step 638. In general, step 638 includes the dynamic association and dissociation of project 60 with a graphical object 30 in response to an initiated event, as described in greater detail with reference to the flowchart illustrated in FIG. 11. Upon dynamically associating with the appropriate graphical object 30, project 60 queries, stores, updates, or performs any other number and combination of data processing functions upon data items 354 of data client 352 according to data request 358. Project 60 further performs any number and combination of enhanced functions, described in more detail with reference to FIG. 8, in response to the execution of the data processing functions. Execution terminates at step 640.

Figure 14:
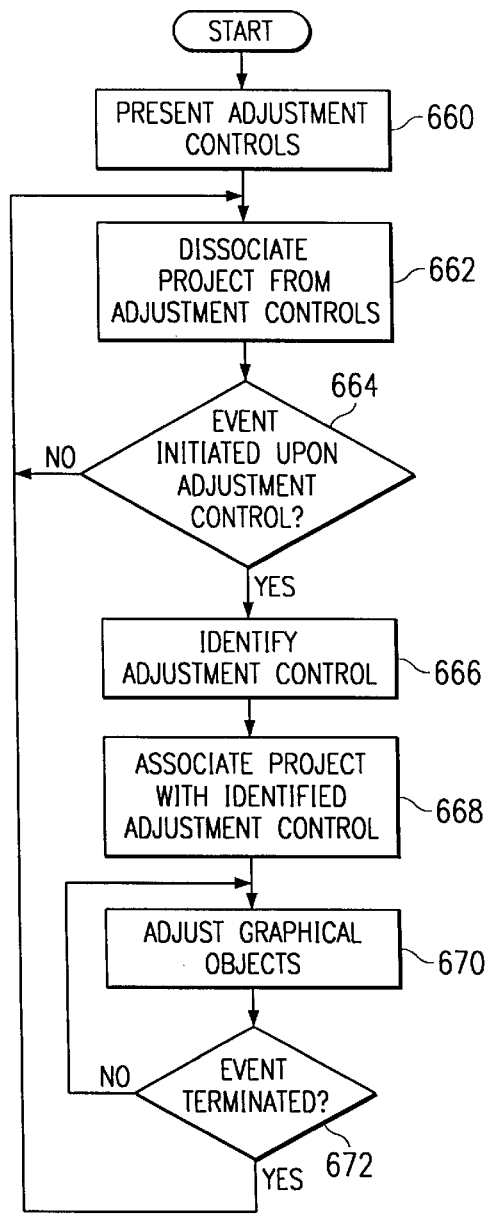
FIG. 14 illustrates a method for adjusting a graphical object.

FIG. 14 is a flow chart of an exemplary method for adjusting a graphical object 30. The method begins at step 660, where a project 60 presents one or more adjustment controls 400. Adjustment controls 400 comprise control points operated by a user of system 10 to adjust graphical or other data for any of a class of graphical objects 30 associated with the project 60. A particular project 60 may present any number and combination of adjustment controls 400 to adjust the color, geometry, or any other graphical representation of graphical objects 30. Application 22 dissociates the project 60 from the adjustment controls 400 at step 662. In this respect, a project 60 is free to process an event initiated upon any of the adjustment controls 400. Event manager 32 determines whether an event is initiated upon an adjustment control 400 at step 664. If no events are initiated, execution returns to step 662.

If an event is initiated upon an adjustment control 400 as determined at step 664, event manager 32 identifies the adjustment control 400 at step 666. Event manager 32 associates the project 60 with the identified adjustment control 400 at step 668. For example, event manager 32 may direct the interface module 34 of the project 60 to associate with the identified adjustment control 400 using a pointer 36 as described with reference to FIG. 1.

Project 60, associated with the identified adjustment control 400, adjusts one or more of an associated class of graphical objects 30 at step 670. For example, if the identified adjustment control 400 comprises a color adjustment control 400a, then project 60 adjusts the color of one or more of an associated class of graphical objects 30. Similarly, if the adjustment control 400 comprises a gauge adjustment control 400b or a geometric adjustment control 400c, project 60 adjusts the fill capacity or geometric representation of one or more of an associated class of graphical objects 30, respectively.

Event manager 32 determines whether the event initiated upon the adjustment control 400 is terminated at step 672. If the event is not terminated, execution returns to step 670 where project 60 continues to adjust the graphical objects 30. If the event initiated upon the adjustment control 400 is terminated as determined at step 672, execution returns to step 662 where event manager 32 dissociates the project 60 from each of its adjustment controls 400. The project 60 is then free to adjust further graphical objects 30.

Although the present invention has been described with several embodiments, a myriad of changes, variations, alterations, transformations, and modifications may be suggested to one skilled in the art, and it is intended that the present invention encompasses such changes, variations, alterations, transformations, and modifications as fall within the spirit and scope of the appended claims.

What is claimed is:

1. A system for controlling the operation of a graphical object, comprising:

a memory operable to store a plurality of graphical objects;

a display coupled to the memory and operable to display he graphical objects;

a processor coupled to the memory and to the display, the processor operable to present a form having a plurality of options to be selected by a user to define a class of graphical objects, an event menu operated by the user to select an event, and an editor operated by the user to write instructions for association with the event selected by The user;

an event manager coupled to the memory and operable to detect the initiation of the event upon a particular one of the graphical objects of the defined class of graphical objects, and further operable to detect the termination of the event; and a plurality of projects coupled to the event manager, each of the projects operable to associate with any of the graphical objects in a particular class, a selected one of the projects operable to associate with any of the graphical objects in the class defined by the user and, in response to a notification from the event manager, to associate with the particular graphical object in response to the detected event initiation, to execute the instructions associated with the event, and to dissociate from the particular graphical object in response to the detected event termination.

2. The system of claim 1, wherein the instructions comprise first instructions associated with a first event and second instruction associated with a second event.

3. The system of claim 1, wherein the project is further operable to present a form operated by a user to store data associated with the particular graphical object.

4. The system of claim 1, wherein the project comprises a first project having instructions using first variables, the system further comprising a second project having instructions using the first variables.

5. A method performed on a computer for controlling the operation of a graphical object, comprising:

maintaining a plurality of graphical objects in a memory;

displaying the graphical objects;

presenting a form having a plurality of options to be selected by a user to define a class of graphical objects;

in the form, presenting an event menu operated by the user to select an event associated with the class of graphical objects;

in the form, presenting an editor operated by the user to write instructions;

providing a plurality projects, each of the projects operable to associate with any of the graphical objects in a particular class of graphical objects;

detecting the initiation of the selected event upon a particular one of the graphical objects, the particular graphical object in the class of graphical objects defined by the user in response to detecting, determining one of the projects operable to associate with the class of graphical objects defined by the user notifying the determined one of the projects; and executing a portion of the instructions in response to the selected event initiation using the determined one of the projects.

6. The method of claim 5, wherein:

the particular graphical object comprises a particular one of a plurality of different types of graphical objects; and the class of graphical objects comprises a particular scope of graphical objects of the particular type.

7. The method of claim 6, wherein the different types of graphical objects comprise a document, a graphical diagrams, a graphical shape, or a graphical connector.

8. The method of claim 5, wherein the event comprises an input event executed upon the particular graphical object.

9. The method of claim 5, wherein the instructions comprise:

first instructions associated with the selected event; and second instructions associated with a second event.

10. The method of claim 9, wherein the particular graphical object comprises a first graphical object, the method further comprising:

detecting the initiation of a second event upon a second one of the class of graphical objects prior to the termination of the event upon the first graphical object; and executing the second instructions in response to the second event initiation.

11. The method of claim 5, wherein the particular graphical object comprises a graphical shape of a first document and the instructions comprise a portion of a project associated with the graphical shape, the method further comprising:

storing a copy of the graphical shape in a shape palette;

storing a copy of the project in the shape palette;

inserting the copy of the graphical shape in a second document; and inserting the copy of the project in the second document.

12. The method of claim 11, wherein the determined project has a first unique identifier, the method further comprising:

generating a second copy of the determined project having modified instructions and a second unique identifier;

storing the second copy of the determined project in the shape palette; and inserting the second copy of the determined project in the second document if the first unique identifier matches the second unique identifier.

* * * * *